March 12, 1940.  T. R. HARRISON  2,193,096
CONTROL APPARATUS
Filed Sept. 18, 1935   5 Sheets-Sheet 1
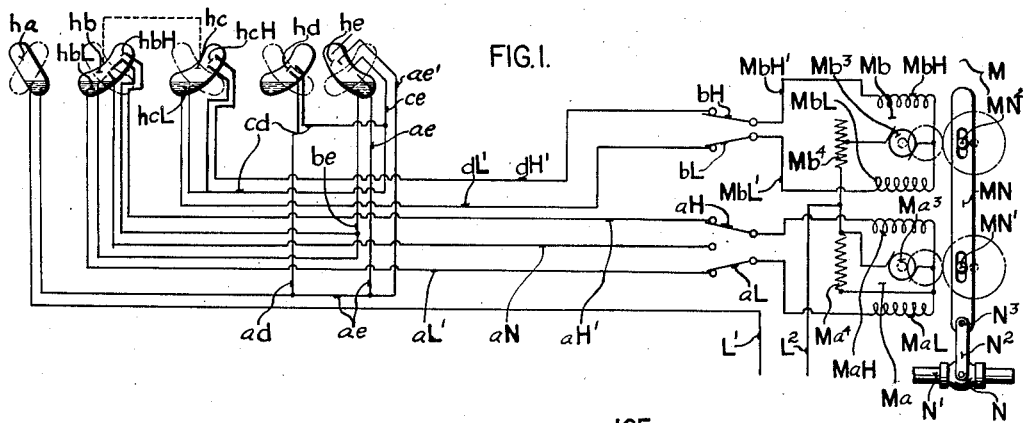
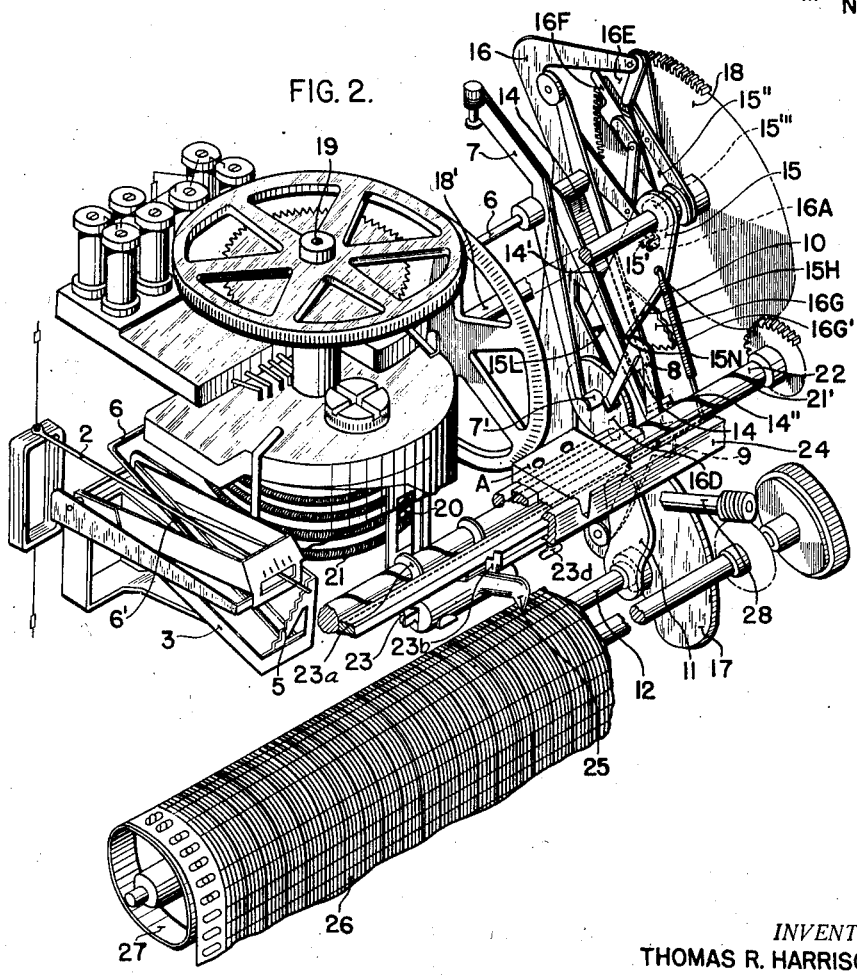
INVENTOR.
THOMAS R. HARRISON
BY John E. Hubbell
ATTORNEYS.

March 12, 1940.　　T. R. HARRISON　　2,193,096
CONTROL APPARATUS
Filed Sept. 18, 1935　　5 Sheets-Sheet 2

INVENTOR.
THOMAS R. HARRISON
BY John E. Hubbell
ATTORNEYS.

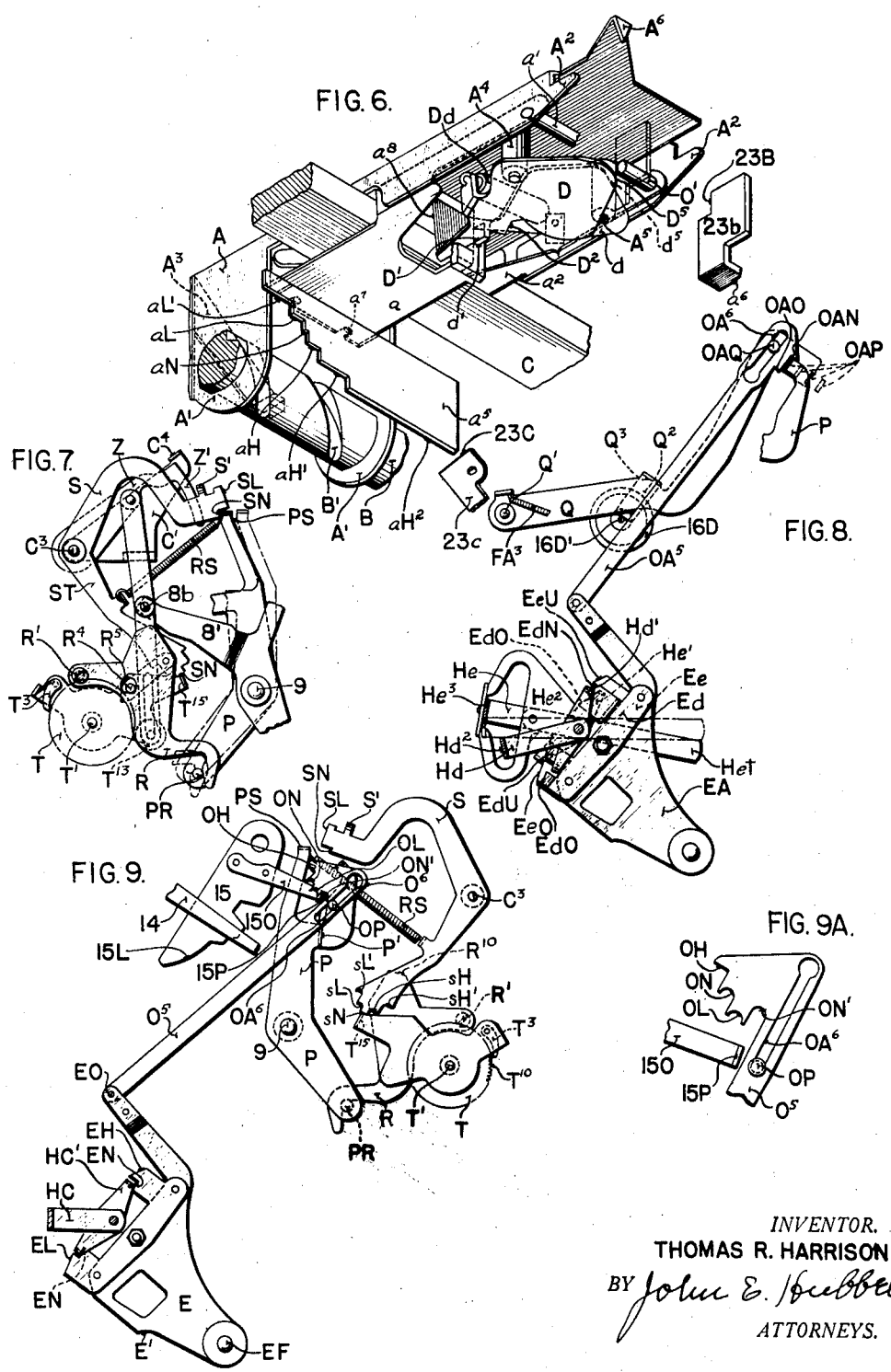

March 12, 1940.  T. R. HARRISON  2,193,096
CONTROL APPARATUS
Filed Sept. 18, 1935   5 Sheets-Sheet 5
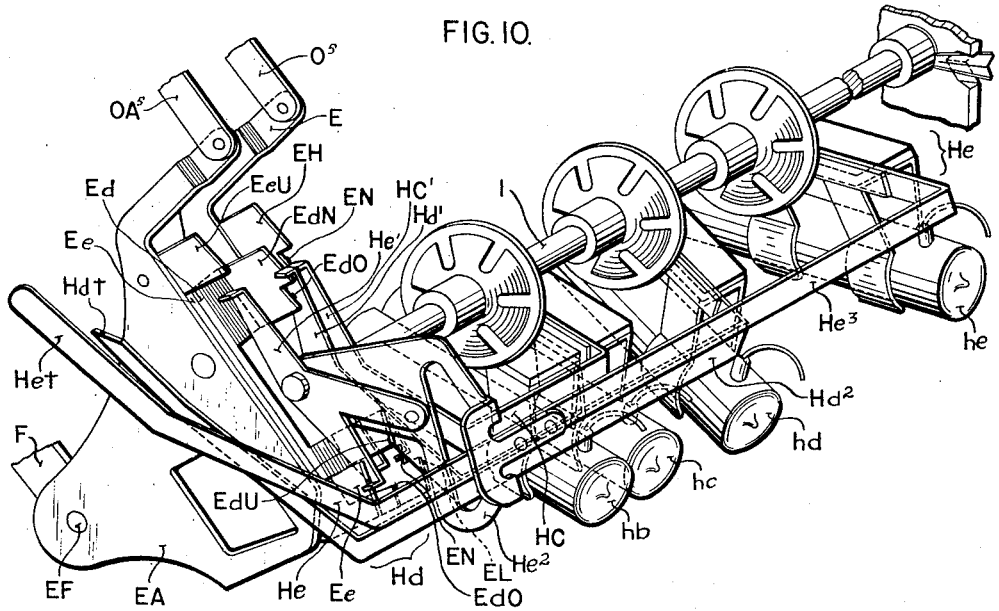
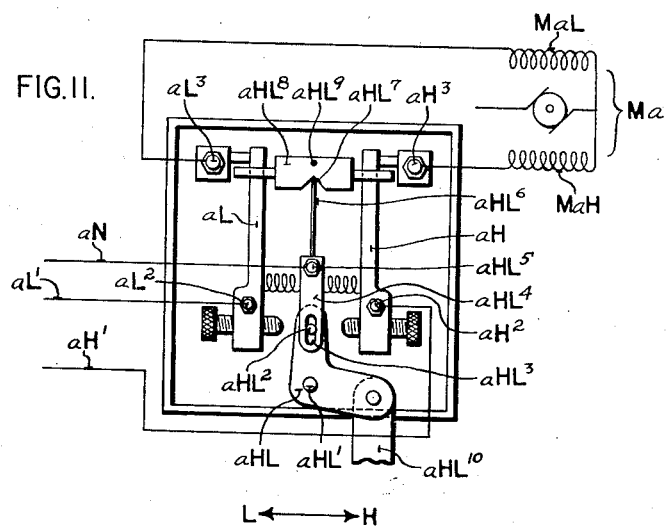
INVENTOR.
THOMAS R. HARRISON
BY John E. Hubbell
ATTORNEYS.

Patented Mar. 12, 1940

2,193,096

UNITED STATES PATENT OFFICE 2,193,096

CONTROL APPARATUS

Thomas R. Harrison, Wyncote, Pa., assignor to The Brown Instrument Company, Philadelphia, Pa., a corporation of Pennsylvania Application September 18, 1935, Serial No. 41,017

32 Claims. (Cl. 236—70)

This application relates to control apparatus and more particularly to control apparatus for controlling a variable condition, such as pressure, temperature, humidity, flow or the like, to maintain a predetermined value of said condition.

A general object of the present invention is to provide an improved method of, and apparatus for effecting control in collective accordance with variations in the magnitude of a controlling condition and the trend of change in said magnitude. The invention is especially adapted for use for effecting control actions tending to maintain the controlling condition magnitude approximately constant at a predetermined or normal value, and to return it to that value on departures therefrom with desirable rapidity and with a minimum tendency to hunting. The invention is well adapted, for example, for use in regulating the fuel supply to a furnace so as to maintain a furnace temperature or furnace heating effect, at a constant normal value, which ordinarily is susceptible of adjustment.

Although adaptable to other uses, my invention is of special utility in connection with potentiometric measuring apparatus comprising a galvanometer deflecting in accordance with potentiometric unbalance resulting from a change in value in a condition measured by said apparatus and automatic potentiometer rebalancing means serving also to adjust an indicator or recorder member. When so used, my invention includes the control of mercury switches or analogous control devices jointly in response to the deflections of the galvanometer and the deflections of the indicator or recorder member.

In my prior Patent 1,946,280, issued February 6, 1934, I disclosed potentiometric measuring apparatus including control instrumentalities, of the character mentioned above, but the improved apparatus disclosed herein, while similar in many respects to, includes modifications in, and improvements over the apparatus disclosed in said patent, whereby I obtain greater flexibility in, and wider range of use is achieved, and facilitate the manufacture and assembly of the apparatus, and also make possible control actions and results not obtainable with the form of apparatus disclosed in said patent.

The present invention is characterized in particular, by the fact that it provides for a control action responsive to trend of change in the controlling condition during successive periods or cycles of variable length and each of which is terminated by a control action which is dependent on, and results from departure from its normal value of the magnitude of the controlling condition during the period terminated, and which may be produced either by relatively small departures existing during a relatively long portion of the period, or by a larger departure existing during a shorter portion of the period.

The present invention, in its preferred form, is further characterized by the use of two electric control motors, and of energizing circuit connections therefor comprising a plurality of control switches, some of which are operatively individual to one motor while one or more of the switches is used in controlling both motors, and of different adjusting mechanisms operating different switch groups and respectively responsive to different relations between the trend and magnitude characteristics of the controlling condition.

Specific objects of the invention are the provision of various novel instrument features and combinations adapted for use in the attainment of the more general objects of the invention, and each contributing to the mechanical or operating simplicity or effectiveness of the control instrument.

The above mentioned and other objects and advantages of the invention will be manifest from the detailed description following when taken in connection with the accompanying drawings whereof:

Fig. 1 is a wiring diagram of my control apparatus;

Fig. 2 is a more or less diagrammatic view showing in perspective a portion of my apparatus;

Fig. 6 is a detailed perspective view showing certain control parts;

Fig. 7 is a view of parts disclosed in Fig. 3 but on a smaller scale and in different time relation;

Fig. 8 is a detailed view on a smaller scale of parts shown in Fig. 5 but in a different time relation;

Fig. 9 is another detailed view of parts shown in Fig. 5;

Fig. 9A is another detailed view of Fig. 5;

Fig. 10 is a detailed perspective view of certain control elements, and

Fig. 11 is a detailed view of a limit switch used with my invention.

Figure 3:
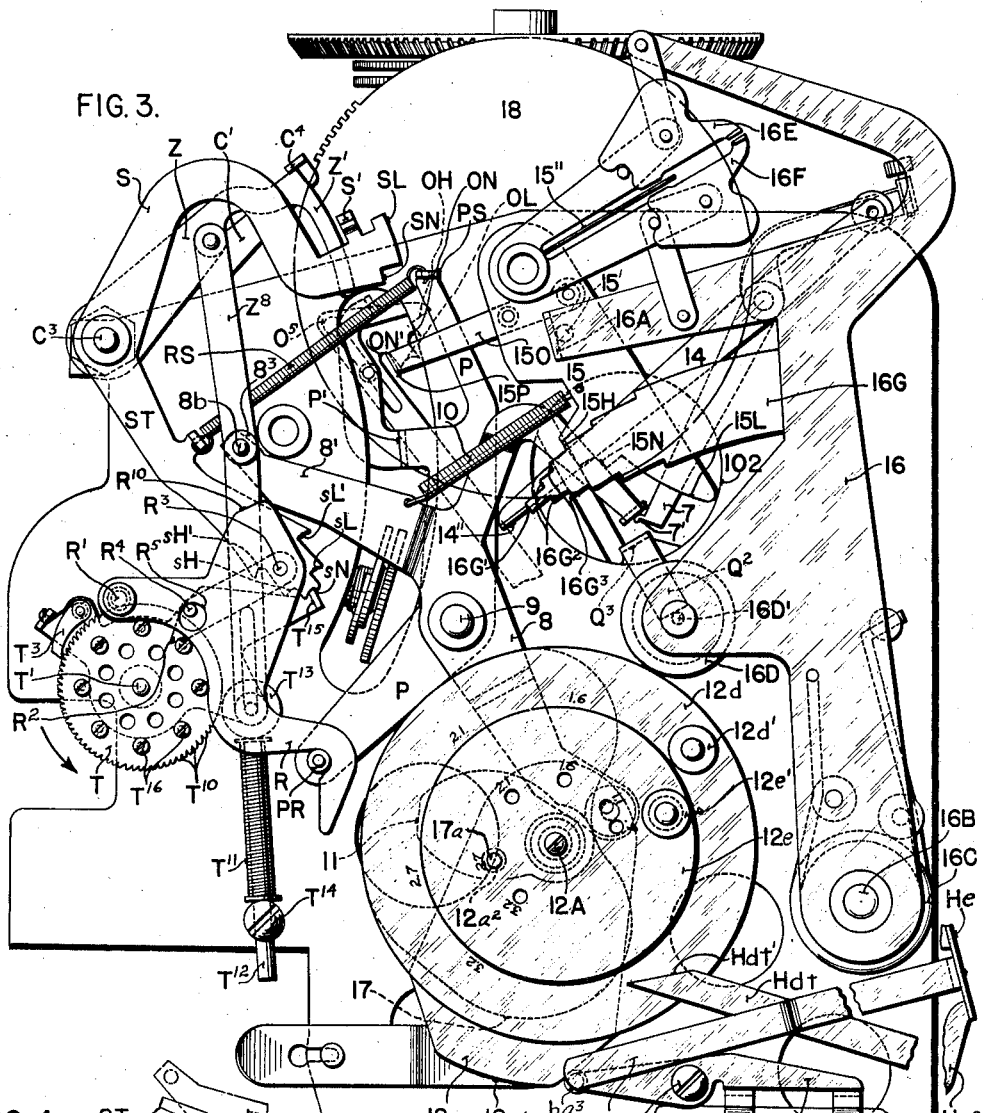
Fig. 3 is a side elevation looking from the right of Fig. 2 but showing certain parts not disclosed in the latter.

The recording potentiometer instrument shown in perspective in Fig. 2, and significant operative parts of which are illustrated in other figures includes a galvanometer, the pointer 2 of which deflects in response to a condition of unbalance in the potentiometer measuring circuit including a resistance such as resistance 21 shown in Fig. 2, which may be adjusted to rebalance the potentiometer. The instrument also comprises mechanical relay provisions operated by a constantly rotating driving motor not shown, and controlled by the deflection of the galvanometer pointer 2 away from its normal zero position, to periodically rebalance the potentiometer circuit and move a pen or other recorder carriage 23 along a travelling record strip 26 to record the varying value of the quantity measured on said strip.

In respect to its recording potentiometer functions the instrument shown in Figs. 1–7 is of the form disclosed in an application for patent Serial No. 546,290, filed June 23, 1931, jointly by Ernest H. Grauel, Ernest Kessler and me now Patent No. 2,150,502, dated March 14, 1939, and in the control mechanism employed in the instrument shown herein, I make use of certain instrumentalities disclosed in my previously mentioned prior Patent 1,946,280.

The control provisions, which in their construction and arrangement, or in their combination with the above-mentioned rebalancing and carriage adjusting and control mechanism, constitute the features of the present invention, include a control table A and means by which control switches are periodically actuated by said mechanism, when the recorder carriage 23 is displaced in one direction or the other from the control table. The control table A is normally stationary but may be manually adjusted along the path of movement of the carriage 23. The position of the control table along said path corresponds to, and determines the normal value of the quantity measured, while the position at any instant, of the carriage 23 corresponds to, and constitutes a measure of, the current value of said quantity.

The mechanism of the instrument of Fig. 2 through which the deflection of the galvanometer pointer 2 controls the adjustments of the recorder carriage 23 and the rebalancing of the potentiometer circuit on a variation in the quantity or value measured by the galvanometer comprises a pointer engaging and position gauging element 3. The latter is pivotally supported and in connection with the hereinafter mentioned shaft 6 has a loading tendency, which may well be due partly to spring and partly to gravitational action, to turn upward into the position in which one or another of the shoulders 5 of the member 3 engage the pointer 2. The element is engaged by, and turns with the arm 6' of a rock shaft 6. A spring 10 tends to hold a rocker 8 which is journalled on a pivot 9, in the position in which the rocker engages an arm 7 secured to the shaft 6 and thereby holds the latter in a position in which the shoulders 5 are all below the pointer 2.

A cam 11 which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 2, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7 thus permitted, will be greater or less according to the deflective position of the pointer 2 at the time. When the arm 7 thus turns counter-clockwise, a lateral projection 7' of that arm engages and turns a secondary pointer element 14 into a position corresponding to the then deflection of the pointer 2. The secondary pointer 14 is loosely journalled on the shaft 6, and has a gravitational loading tendency to turn in the clockwise direction as seen in Fig. 2, so that the arm 14 normally bears against the projection 7' of the arm 7.

At the end of each angular adjustment of the secondary pointer 14 into a position corresponding to the then deflection of the galvanometer 2, one or another of the three shoulders 15H, 15N and 15L of a locking member 15, engages the bottom wall of a slot 14' in the member 14 and thereby frictionally holds the latter in the position occupied by it when such engagement occurs. When the pointers 2 and 14 occupy their neutral positions, the shoulder 15N of the member 15 comes into locking engagement with the member 14. When the galvanometer pointer 2 has deflected to the right as seen in Fig. 2, as it does when the actual value of the quantity measured is lower than that indicated by the previously made and still existing potentiometer adjustment, the secondary pointer 14 is engaged and locked by the shoulder 15L. When the galvanometer pointer deflects in the opposite direction from its neutral position, as it does when the actual value of the quantity measured is higher than that indicated by the existing potentiometer adjustment, the pointer 14 is engaged and locked by the shoulder 15H of the member 15. The locking part 15 is given a tendency to move into locking engagement with the secondary pointer 14 by the spring 10, but is periodically held out of such engagement by the action on its projection 15' of a projection 16A carried by a ratchet lever 16 pivoted at 16B.

A spring 16C gives the lever 16 a tendency to turn forward in the clockwise direction as seen in Fig. 2, but throughout the major portion of each rotation of the shaft 12 the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls have a gravitational tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2 is in its neutral position.

The position assumed by the part 15 when in locking engagement with the secondary pointer 14, controls the action of the pawls 16E and 16F by virtue of the fact that a collar or hub portion 15''' of the part 15 carries a spring pawl engaging arm 15''. The movement of the locking part 15 into the position in which its shoulder 15H engages the secondary pointer 14 causes the arm 15'' to move the pawl 16E into operation engagement with the teeth of the ratchet wheel 18, and the clockwise or forward movement of the ratchet lever 16 then gives a clockwise adjustment to the ratchet wheel. Conversely, when the part 15 moves into the position in which its shoulder 15L engages the secondary pointer 14, the arm 15" shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14" of the secondary pointer 14 and thereby arrest the forward movement of the ratchet lever 16. In the neutral position of the galvanometer pointer and secondary pointer 14, the projection 14" of the latter engages the central shoulder 16G' of the arm 16G and the lever 16 is then held against any operative movement in the clockwise direction. When the secondary pointer position is more or less to one side or the other of its neutral position, the portion 14" engages an upper or lower shoulder 16G$^2$ or 16G$^3$ more or less distant from the central shoulder 16G$^1$ and the lever 16 is then permitted more or less forward movement.

The rotation of the wheel 18 in one direction or the other effects corresponding potentiometer rebalancing adjustments and position adjustments of the recorder carrier 23. The rebalancing adjustments are effected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear carried by a carriage adjusting shaft 22 which is formed with a thread groove 22' of coarse pitch which receives a cam or mutilated screw thread rib secured to the carriage 23, so that the latter is moved longitudinally of the shaft 22 as the latter is rotated.

The marker carriage 23 comprises a frame portion formed of a single piece of sheet metal cut and bent to form a flat underbody portion with uprising projections. Those projections include two apertured ears 23a at the rear corners of said body portion transverse to and through which the shaft 22 extends; two projections 23b, one at each front corner of said body portion which bear against the inner edge and upper side of the lower flange of a channel bar or rail 24 forming part of the instrument framework, and three intermediate projections 23c which extend in vertical planes transverse to, and are arranged in a row parallel to, the shaft 22 and rail 24. In addition the body portion of the carriage frame is provided with a forwardly extending tongue passing beneath the rail 24 and terminating in an uprising pointer or index 23d adapted to cooperate with a scale marked on the front face of the rail 24 to indicate the position of the pen carriage, and the value of the quantity measured and recorded by the instrument.

The record sheet 26 passes over and is given feeding or advancing movements by a record feed roll 27. The latter is intermittently rotated by means of a worm and screw connections between the shaft of the roll 27 and a transverse shaft 28. Shaft 28 is intermittently actuated by means of a ratchet and lever device 30 which is engaged and oscillated by the arm 8' of the rocker 8 on each oscillation of the latter.

The control table A of the instrument, shown best in Figs. 2 and 6, comprises a sheet metal frame having ear portions A' apertured for the passage of a shaft B mounted in the instrument framework alongside the shaft 22 and having bearing parts A$^2$ which engage and slide along the upper flange of the rail 24. To facilitate the adjustment of the control table A along the path of travel of the pen carriage 23, the shaft B is shown as formed with a thread groove B$^1$ receiving a cam or mutilated thread rib part A$^3$ secured to the control table frame. The shaft B may be rotated to adjust the control table in any suitable manner as by means of a transverse shaft geared to the shaft B and rotated by an operating handle or knob at the front of the instrument. An index A$^6$ in conjunction with a scale on the front face of the rail 24 may indicate the adjustment of the table and the corresponding normal value of the quantity measured.

A member $a$ is hinged at one edge to the frame of the control table A by a pivot or pintle shaft $a'$ extending parallel to the shaft B. The member $a$ is formed with guiding provisions including a part $a^2$, for a bar-like part C which extends parallel to the shaft B and is rigidly secured at its ends to arms C$^1$ at opposite ends of the instrument which are pivotally connected at C$^3$ to the instrument framework so that the yoke like structure formed by the bar C and arms C$^1$ may turn with respect to the instrument framework about an axis coinciding with that of the hinge connection $a^1$, between the table A and part $a$. The part $a$ and bar C are held by the said guiding provisions against independent turning movements about the axis of their respective pivotal supports. The part $a$ and bar C have a gravitational tendency to move from their highest positions, slightly above that shown in Fig. 5 into or toward their lowermost positions. Their movement downward below their last-mentioned positions is prevented by the engagement of a projection C$^4$ from the arm C$^1$ with an adjacent portion of the instrument framework. The parts $a$ and C are positively held in their uppermost positions by the action of a lever Z, except during the portion of each revolution of the shaft 12 when the cam 11 renders the lever Z inoperative to prevent downward movement of arm C$^1$. Lever Z is pivoted at C$^3$ and is connected by link Z$^8$ to arm 8$^1$ of rocker 8 whereby clockwise rotation of rocker 8 will rotate lever Z into the position shown in Fig. 3 engaging projection C$^4$ and carrying arm C$^1$ to its highest or clearance position. The extent to which the parts $a$ and C are permitted to swing downwardly from their uppermost positions during each period when the action of the cam 11 renders the lever Z temporarily inoperative, depends upon the then relative positions of the table A and the recorder carriage 23. When the value of the quantity measured is so low that the carriage 23 is entirely at the low side (left-hand side as seen in Fig. 2) of the control table A, the carriage 23 does not interfere with the movement of the parts $a$ and C into their lowermost positions.

Figure 5:
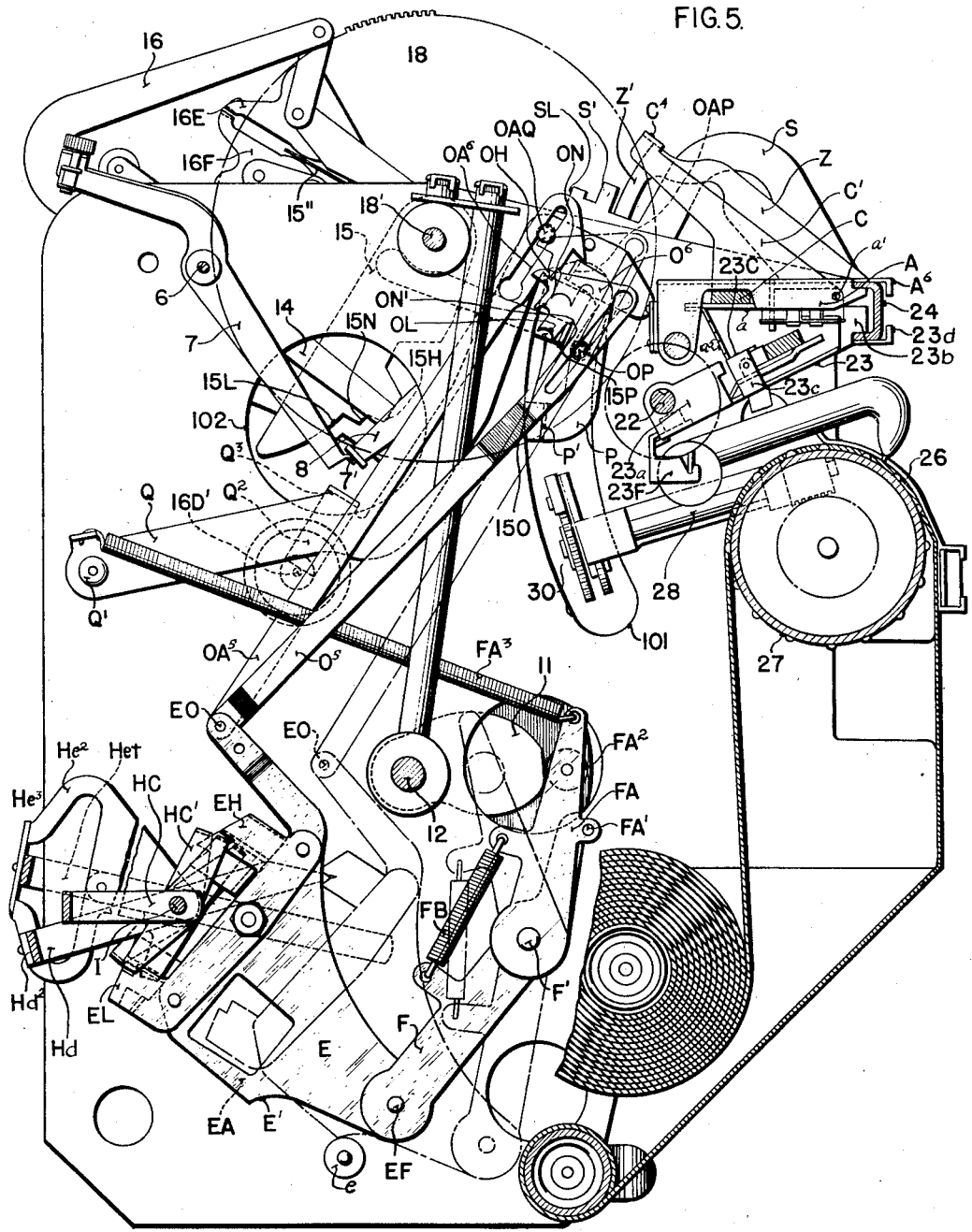
Fig. 5 is an elevation of the opposite side of the instrument side plate shown in Fig. 3.

When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. For the purpose of such engagement the part $a$, as shown in Figs. 5 and 6, has a carriage engaging portion $a^5$ detachably secured to it. The part $a^5$ is in the form of a plate with a downwardly projecting body portion terminating in a lower horizontal edge $aH^2$, and a series of steps $aH^1$, $aH$, $aN$, $aL$ and $aL^1$ vertically removed from edge $aH^2$ but parallel thereto and having at its upper edge a lateral flange portion bearing against the underside of the part $a$ at the rear edge of the latter and detachably secured thereto by clamping screws $a^7$. The bodies of said screws pass through slots in the part $a$ which are open at the rear edge of the latter.

The lower edge $aH^2$ of the projection $a^5$ is so disposed that it may engage and rest upon the shoulder 23C formed by the upper edge of the projection 23c at the high side of the recorder carriage 23c (the right-hand side as seen in Fig. 2), when the position of said carriage is such as to hold the shoulder 23C beneath said edge $aH^2$. In the condition just described the control table part $a$ cannot move downward below the position shown in full lines in Fig. 5, which is the upper operating position of the part $a$. The movements of the part $a$ above the position shown in Fig. 5 are inoperative movements insofar as the actuation of the control devices is concerned. The uppermost position of the part $a$ above the position of Fig. 5 may be called a clearance position since in that position, part $a$ cannot interfere in any way with movements of the carriage 23, all of which are given the latter while the part $a$ is held in said clearance position.

When an increase in the value of the quantity measured results in a movement of the recorder carriage 23 to the high side of the control table A, that movement causes the part $a$ to be positively secured against down movement from its uppermost operative position by adjusting a latch member D, into its latching position. The latch D is pivotally mounted on a stud $A^4$ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member $d$ pivotally mounted on a stud $A^5$ depending from the underside of the control table frame alongside the stud $A^4$, and a spring $Dd$ connecting the members D and $d$. The spring $Dd$ tends to move the member D in the counter-clockwise direction as seen in Fig. 6 and to move the member $d$ in the opposite direction about their respective pivotal supports $A^4$ and $A^5$; such turning movements of the members D and $d$ are prevented by the engagement of the finger portion $d'$ of the part $d$ with the shoulder $D'$ of the member D, when the latter is in its latching position as shown in Fig. 6. In the non-latching position of the member D, the finger $d'$ engages a shoulder $D^2$ of the part D.

The members D and $d$ are moved from the latched position shown in Fig. 6 into the unlatched position and back again into the position shown in Fig. 6 by the engagement of the recorder carriage shoulder 23B with the cam shaped front edges $D^5$ and $d^5$ of the members D and $d$, respectively. The edges $D^5$ and $d^5$ are so respectively shaped and disposed that as the carriage moves to the high side of the control table, the shoulder 23B acts on the edge $d^5$ to turn the member $d$ counterclockwise, as seen in Fig. 6 so that the spring $Dd$ may then move the member D into its latching position in which its shoulders $D'$ engages the finger $d'$. When the carriage 23 subsequently moves back from its high position, the shoulder 23B engages edge $D^5$ of the member D and moves the latter into its nonlatching position while permitting the spring $Dd$ to move the member $d$ into the position in which its finger $d'$ engages the shoulder $D^2$ of the member D, and holds the latter in its non-latching position.

When the value of the measured condition is at normal, which will occur when the index 23d of the carriage 23 is adjacent the index $A^6$ of the table A, the projection 23C of the carriage 23 will be so disposed with relation to the table A that upon a downward movement of the part $a$, the step $aN$ of the part $a^5$ will engage said projection. A slight increase in the value of the quantity measured will result in a deflection of the carriage 23 to the right as seen in Fig. 6 in which position a downward movement of the part $a$ will result in engagement of the step $aH$ with projection 23C, a further deflection of carriage 23 to the right or the high side will cause engagement of the step $aH^1$ with projection 23C when part $a$ is depressed, and a still further deflection to the high side will result in the relation of the parts previously described in connection with Fig. 5 in which step $aH^2$ is directly above projection 23C. On a slight decrease in the value of the quantity measured, from the position in which the projection 23C is disposed beneath the step $aN$, the projection 23C will be in a position in which it is adapted to be contacted by the step $aL$ upon a downward movement of the part $a$, and upon a further decrease in the quantity measured resulting in further deflection of the carriage 23 to the left as seen in Fig. 6 the projection 23C will be in a position in which it is adapted to be engaged by the step $aL^1$. Further deflection of the carriage 23 to the low or left hand side will carry the projection 23C beyond the province of the part $a$ and in this position the part $a$ will not be intercepted by the projection 23C and the part $a$ will therefore be permitted its full downward motion as limited by engagement of the projection $C^4$ of the member $C^1$ with the top edge of the instrument side plate.

The above described cooperation of the control table A and the pen carriage 23 may be utilized to directly effect control action as desired but it is the object of the present invention to combine with the action resulting from the cooperation of the control table and the pen carriage, further control functions contributing to a finer degree of control than would be possible with the former alone. The action due to the cooperation of table A and carriage 23 just described might be termed a magnitude function since it is an action in response to the total deviation of the quantity from a predetermined value and I desire to combine therewith a control action which is a function of the rate of change of said quantity to produce a resultant control action. As previously described, the mechanical relay provision of Fig. 2 rebalances the potentiometric circuit, to the unbalance of which the galvanometer pointer 2 is responsive, and accordingly the rebalancing operations restore or tend to restore the galvanometer pointer 2 to its neutral position or null point. The rebalancing operations occur at regular intervals so that the periodic restoration to and deflection from neutral of the galvanometer pointer 2 renders the extent of deflection of the latter when clamped at regular intervals, a measure of the rate of change of said quantity.

The means by which the existing deflection of the galvanometer pointer 2 comprising the rate of change component, is measured and combined with the deviation component resulting from the cooperation of the control table A and the carriage 23 include stops and guiding members for a pair of links $O^5$ and $OA^5$ shown in Fig. 5 and two floating members E and EA connected to said links respectively. The members E and EA are pivotally connected at EF to the part F of a compound lever comprising parts F and FA each pivoted to the instrument framework at F' and normally held against relative movement by a spring FB. The latter tends to hold the part F in engagement with a projection FA' of the part FA, but serves as a safety device which may yield to prevent injury of the parts in case the switch parts actuated by the member should jam. A spring $FA^3$ extends between the upper end of the lever part FA and a lever Q and tends to hold the parts F, FA and E and EA in the positions shown in dotted lines in Fig. 5. The lever FA is moved from the dotted line position into the full line position of Fig. 5 once during each rotation of the shaft 12, by the cam 11, which then engages a cam roll follower $FA^2$ carried by the lever part FA.

When the parts are in the positions shown in dotted lines in Fig. 5, the lower cam edge $E^1$ of the member E rests upon a roller support $e$ mounted on the instrument framework, and the positions of the members E and EA are then such that the links $O^5$ and $OA^5$ are raised to an initial or clearance position from which they are subsequently permitted to descend. When lever part F is turned in the clockwise direction from its Fig. 5 dotted position the weight of links $O^5$ and $OA^5$ and members E and EA causes the latter to rotate about pivot EF, moving links $O^5$ and $OA^5$ downward until intercepted by engagement of their upper ends $O^6$ and $OA^6$ with the associated control mechanism.

The control mechanism comprising the leveling and guiding means for the links $O^5$ and $OA^5$ include two levers P and Q and extension 150 of the member 15. The lever P as shown in Figs. 3, 5 and 9 forms a guide means for the link $O^5$ and is the final element by which the hereinbefore described action resulting from the cooperation of table A and carriage 23 introduces the deviation or magnitude component into the collective control action. The member P is journalled on the pivot shaft 9 and carries a pin OP which forms a guide for the link $O^5$ in the up and down movement of the latter. The member P is journalled on the side of the side plate shown in Fig. 3 which is on the opposite side of the side plate from the plane of movement of the link $O^5$ so that a lateral projection $P^1$ of the lever P is provided which extends through the aperture 101 of the side plate.

It is ordinarily sufficient if the control action resulting from the cooperation of the table A and carriage 23, is introduced into the resultant control action relatively infrequently as required and to this end I provide a locking device for automatically rendering this control action inoperative or operative as desired. The locking device includes a lever R journalled at R1 and having a hooked portion adapted to engage a pin PR which is mounted on a downwardly extending portion of the lever P to thereby hold the latter in the inoperative position shown in Figs. 3 and 9. The latched position of the lever P is the normal inactive position of the latter in which the pin OP forms a guide for the link $O^5$ unaffected by the existing relation of table A and carriage 23. At intervals depending upon the cumulative effect of the departure of the pen carriage 23 from its predetermined normal position, the member R is turned clockwise as seen in Fig. 9 about its pivot $R^1$ to thereby release the lever P and permit the latter to turn clockwise under the action of a spring RS until the projection PS at its upper end rotates into engagement with the adjacent portion of a lever S.

The lever S journalled on the pivotal shaft $C^3$ is normally urged clockwise thereabout, as seen in Fig. 9, by the spring RS into a position in which its projection $S^1$ engages the projection $C^4$ of the arm $C^1$ thereby angularly positioning the lever S about $C^3$ in accordance with the position in which the table part $a$ is intercepted by the projection 23C of the carriage 23 in the down movement of said part. The member S is thereby angularly positioned in accordance with the relation of pen carriage 23 and the control table A upon each depression of the table part $a$. The lever S is provided with a series of steps SN and SL adapted to be engaged by the lateral projection PS of the member P. If in the down movement of the part $a$, the step $a$N thereof contacts the projection 23C of carriage 23 the relation and cooperation of the parts hereinafter described precludes unlocking of member P. If the downward movement of part $a$ results in contact of one of its steps $a$L or $a$L$^1$ with projection 23C, or if part $a$ is not intercepted by projection 23C, the step SL of the lever S will be positioned in the path taken by the projection PS when member P is unlocked. If the projection 23C is contacted by a step $a$H, $a$H$^1$ or $a$H$^2$ the angular position of the lever S will be such that the projection PS of the lever P will not engage the lever S and the clockwise rotation of lever P, when unlocked, will terminate by the engagement of projection PS of the latter with extension $Z^1$ of member Z.

Figure 4:
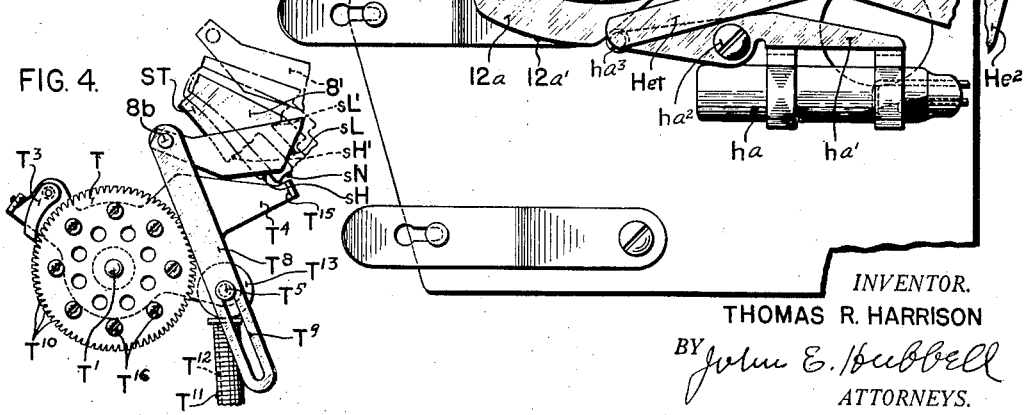
Fig. 4 is a detailed view of Fig. 3 disclosing the parts in different positions.

The means by which the lever P is released by the member R for engagement with the lever S as shown in Figs. 3, 4 and 7 comprises a cam and ratchet arrangement for tripping the lever R at intervals depending upon the departure of the pen carriage 23 from its normal position. As shown a ratchet wheel T journalled on shaft $T^1$ is actuated by a dog $T^3$ carried on the member $T^4$ the latter of which is also journalled on the shaft $T^1$. Member $T^4$ is given clockwise movements about $T^1$ by means of a thrust member $T^8$ connecting a pin $8^b$ of the reciprocating arm $8^1$ with a pin $T^5$ fastened to the member $T^4$. On the counterclockwise rotation of the rocker arm 8 about the shaft 9 the pin $T^5$ is engaged by the upper end of a slot $T^9$ in the link $T^8$ to thereby turn the member $T^4$ to its furthermost position in the clockwise direction in Fig. 4 during which movement the dog $T^3$ slips over the teeth $T^{10}$ of the wheel T. As the rocker arm 8 completes its counterclockwise movement and turns in the clockwise direction, the force of the thrust member $T^8$ is removed from the pin $T_5$ permitting the latter to rise under the action of a spring $T^{11}$ thereby turning member $T^4$ counterclockwise causing dog $T^3$ to engage and drive one of the teeth $T^{10}$. Spring $T^{11}$ surrounds a pin or guiding member $T^{12}$ which is attached to a collar $T^{13}$ journalled on pin $T^5$. Collar $T^{13}$ serves as a thrust member between the spring $T^{11}$ and the pin $T^5$, and the pin $T^{12}$ serves as a guide for spring $T^{11}$. The opposite end of spring $T^{11}$ abuts a stationary stud $T^{14}$ through which the guide member $T^{12}$ passes and upon down movements of the pin $T^5$ the spring $T^{11}$ is compressed between collar $T^{13}$ and stud $T^{14}$ as the guide member $T^{12}$ is permitted to pass diametrically through $T^{14}$.

The amount of counterclockwise motion permitted to the member $T^4$ and thereby the angle through which wheel T is advanced under the action of spring $T^{11}$ is governed by a downwardly extending arm ST of the lever S which is provided with a series of steps $sN$, $sL$, $sL^1$, $sH$ and $sH^1$, one or another of which is engaged by a projection $T^{15}$ of the member $T^4$ in the counterclockwise rotation of the latter. If the step $sN$ is engaged by the projection $T^{15}$ the amount of angular movement given to the member $T^4$ will be insufficient to bring the dog $T^3$ into engagement with a tooth $T^{10}$ of the member T. If however a step $sL$ or $sH$ is engaged by the projection $T^4$, the dog $T^3$ will engage a tooth $T^{10}$ and move the latter an amount depending upon the displacement angularly about the center $T^1$ of the step engaged. A movement of the projection $T^{15}$ of the member $T^4$ into engagement with a step $sL^1$ or $sH^1$ will of course result in a greater turning movement of the wheel T under the action of dog $T^3$. Although any desirable turning movement of the wheel T in response to engagement of the projection $T^{15}$ with a step of the member S may be made, I preferably proportion the parts such as to move the lever T the distance equal to the width of one tooth upon engagement with a step $sL$ or $sH$ and a distance corresponding to the width of four teeth when a step $sL^1$ or $sH^1$ is engaged by the projection $T^{15}$.

Which of steps $sN$, $sL$, $sL^1$, $sH$ or $sH^1$ of the member S, is positioned in the path of projection $T^{15}$ of member $T^{14}$ depends upon which of the steps $aN$, $aL$, $aL^1$, $aH$ or $aH^1$ of part $a$ respectively, is then in engagement with carriage 23. Contact of step $aH^2$ with carriage 23 or failure of part $a$ to contact the carriage will also result in positioning step $sH^1$ or $sL^1$ in the path of projection $T^{14}$.

The wheel T carries a series of studs $T^{16}$ adapted to engage a plate-like member $R^2$ pivoted at $R^3$ to the member R, which carries a pin $R^4$ projecting through a slot $R^5$ in the member R. When, in the counterclockwise rotation of the wheel T, a stud $T^{16}$ engages the member $R^2$ and carries the pin $R^4$ against the upper edge of slot $R^5$ of the member R the latter lever will be turned counterclockwise to disengage the pin PR of the lever P. The lever P will thus be permitted to turn counterclockwise as seen in Fig. 3 toward engagement with the upper portion of member S. After a stud $T^{16}$ of the member T passes from engagement with the member $R^2$ the latter will be permitted to turn counterclockwise about its pivotal point $R^3$ until the pin $R^4$ engages the bottom of slot $R^5$ thereby conditioning the apparatus for a subsequent tripping movement. Upon the next subsequent counterclockwise movement of the rocker arm 8 the roller 8b will engage the cam surface $R^{10}$ of the member R and force the latter downward and into engagement with the pin PR to thereby again latch up the latter. As shown, eight studs $T^{16}$ are arranged symmetrically about center $T^1$ but it will be clear that I could use more or fewer such studs and thereby vary the rate of release of member P in response to rotation of ratchet T.

From the foregoing it will be clear that member P is released for engagement with member S at a frequency which is dependent upon the cumulative effect of the departure of the controlled condition from normal over a period of time and when released is moved to a position depending upon the then existing extent of departure of the condition from normal. The hereinafter described control actions effected by the apparatus, occur in cycles. Each cycle may be regarded as beginning immediately after each locking engagement of the lever R with the lever P, and as ending with the subsequent relocking of the lever P by the lever R, the lever R being operated to release the lever P during a final portion of each cycle. The length of each cycle varies with, and is a time function, therefore, of the difference between the actual value and a predetermined, or normal, value of the quantity measured, since, as has already been explained, that difference determines the number of rebalancing operations which must occur between the latching and unlatching of the lever P by the lever R. As is hereinafter explained, during the earlier portion of each cycle in which the lever R is in latching engagement with the lever P, each rebalancing operation results in a control action which is solely dependent on the trend of change in the quantity measured existing at the time, while in the final portion of each cycle, during which the lever P is unlatched, a single control action is effected, and that action depends upon the magnitude of the deviation or departure from its normal value of the quantity measured, though said action may be modified as a result of the then existing trend of change in said quantity. Stated differently, during each period or interval of varying length during which the lever R is in latching engagement with the lever P, a variable plurality of control actions dependent on trend, are effected, and between each two successive such intervals, a control action dependent on the magnitude of the quantity measured, is effected. The frequency with which the last mentioned control actions are successively effected, obviously varies with, and depends upon the length of the intervals during which control actions dependent on trend, are effected.

As described the member P is released for engagement with lever S only in response to an advance of ratchet T which advance can occur automatically, only when the position of part S is other than at its normal position because in the normal position of part S, the step $sN$ prevents actuation of ratchet T. In order to prevent an erroneous control actuation in the event of accidental or other manual release of member P, however, the part S is provided with neutral step $sN$ which is adapted to be contacted by projection PS of lever P when the latter is released with the member S occupying its normal position. Although only three conditions of operation exist between members S and P it will be understood that a finer degree of control may be obtained by providing additional steps similar to steps sN and sL on the member S to thereby obtain as many positions of member P as there are positions of part $a$ with respect to carriage 23.

As just described the guide pin OP assumes one of four positions depending upon whether the lever P is in its locked position or whether, when released, the lever P engages the step sN, sL of, or does not engage the lever S thereby forming four paths for the link $O^5$. The manner in which the link $O^5$ controls the position of the member E on the downward movement of said link depends not only upon which of the four paths, determined by the pin OP, the link takes in its downward movement but also upon the then position of the projection 15P formed on the extension 150 of the member 15. As described in connection with Figs. 2 and 3, the member 15 occupies one of three positions, when permitted to do so by the counterclockwise rotation of the lever 16 in Fig. 3, accordingly as the galvanometer is in its neutral position or is deflected to the high or low side from its neutral position. The projection 15P will accordingly assume one of three positions depending upon the current deflection of the galvanometer pointer.

If the galvanometer pointer is at its neutral position when the member 15 turns counterclockwise as seen in Fig. 5 so that the step 15N engages the member 14, and at that time the lever P is in its locked position, the relative position of projection 15P and guide pin OP will be such that the projection 15P will be engaged by a step $ON^1$, formed at the upper end of the link $O^5$, upon the downward movement of the latter. If upon release of the lever P, the projection PS of the lever P engages the step $sn$ of the lever S the pin OP will be in a position removed to the left in Fig. 5 from its locked position and if at that time the member 15 is in its neutral position, the downward travel of the link $O^5$ will result in the engagement of a step ON of the link $O^5$ with the projection 15P of the lever P. For the control purposes now to be described, the position of the lever $O^5$ at the termination of its downward movement with the last mentioned relation of projection 15P and pin OP will correspond exactly to the position of lever $O^5$ at the termination of its downward movement in the first mentioned action in which the lever P is locked. In either of the positions just described the point of engagement of projection 15P and step ON or $ON^1$ will form a fulcrum for link $O^5$ and the member E, when the latter is subsequently moved forward under the action of cam 11. The member E in thus moving from its dotted line position in Fig. 5, will follow a path restricted by its connection at EO to link $O^5$. In operation, the member E, as a result of the clockwise movement of member F about $F^1$, will drop sharply downward as the surface $E^1$ moves along guide $e$ until the step of link $O^5$ engages projection 15P and thereafter link $O^5$ will guide member E along a path in an arc generally about the point of engagement of the projection 15P and the step of link $O^5$.

When member 15 is in its neutral operative position and the lever P is released and engages step SL of the lever S as it will when the measured quantity is low, the guide pin OP will be positioned intermediate the two neutral positions just described and the link $O^5$ will be intercepted in its down movement by engagement of its step OL with projection 15P. The forward movement of member E will, with this relation of the parts, pivot about the point of engagement of step OL and projection 15P. Due to the vertical displacement of the steps ON and OL, the movement of link $O^5$ will be thus terminated with its pivotal point at a higher elevation, and member E will therefore be deflected over a higher path than the path over which it is deflected with step ON or $ON^1$ in engagement with projection 15P.

When member 15 is in its neutral operative position and the lever P is released and fails to engage the lever S as it will when the measured quantity is high, the guide pin OP will be further to the right in Fig. 5 than in any of the conditions previously referred to and the link $O^5$ will be so guided in its down movement that the projection 15P will be engaged by a step OH of the link $O^5$. The point of engagement of the step OH and projection 15P will thereby form a pivotal point for link $O^5$ which is lower than the pivotal points formed by steps ON, $ON^1$ and OL as previously described so that the path over which member E is subsequently deflected is lower than the two paths governed by steps ON and $ON^1$ and step OL.

From the foregoing it will be seen that with the galvanometer pointer undeflected, indicating a zero rate of change or stationary condition of the quantity measured, the member E will be deflected over a high, low or intermediate path accordingly as the value of the quantity measured is high, low or normal. I have previously alluded to the possibility of providing the member S with a number of steps equal in number to the steps on the part $a$ to thereby attain a finer degree of control. If the member S were so modified, the member $O^5$ would be provided with a corresponding number of steps so that member E would be deflected over a corresponding number of paths. Where practicable the part $a$, lever S and link $O^5$ may be provided with evenly graduated surfaces instead of steps to attain a still finer degree of control. I prefer for purposes of mechanical simplicity, however, to utilize the mechanism as shown which provides a highly accurate control in that form.

The member E may be utilized to actuate any of various known control devices in deflecting over the selected one of the three control paths. I preferably actuate two three-position mercury switches indicated at $hb$ and $hc$. The switches $hb$ and $hc$ are carried by a bracket HC mounted on a shaft I, the said bracket being provided with an arm $HC^1$ having lateral projections on either side of shaft I. The projections of arm $HC^1$ are arranged in the path of and are adapted to be selectively engaged by fingers EN, EL, and EH of member E. The switches $hb$ and $hc$ are of the three position type. Switch $hc$ is a four contact type of switch as diagrammatically shown in Fig. 1 with a pair of contacts disposed at each end of an enclosed tube containing a mercury pool. Tilting of the switch in one direction or the other will cause the mercury pool to bridge one or the other pair of contacts. When switch $hc$ is level the mercury pool is lodged in the center of the tube and all contacts are open. Switch $hb$ is of the five contact type having a pair of contacts at each end as in switch $hc$ but having a fifth contact in the center of the tube which is adapted to be connected by the mercury pool to one or another or both of the adjacent contacts of the end pairs of contacts when the tube is in its middle position.

Switches $hb$ and $hc$ are both rigidly attached to frame HC and are accordingly both moved together with the frame. When the movement of member E from its dotted position in Fig. 5 is so restrained by link $O^5$ that it travels over its intermediate path, the fingers EN of member E will engage the projections of arm $HC^1$ thereby urging each of switches $hb$ and $hc$ to its open or intermediate position if not already in that position. When member E is caused to travel over its lowest path the finger EH will engage the upper projection of arm $HC^1$ and turn the latter about shaft I thereby tilting switches $hb$ and $hc$ to close contacts $hbH$ and $hcH$ respectively. Movement of member E over its highest path will result in engagement of finger EL with the lower projection of arm $HC^1$ tilting switches $hb$ and $hc$ in the opposite direction to close contacts $hbL$ and $hcL$. Contacts $hbH$, $hbL$, $hcH$ and $hcL$ energize control circuits as later described in detail.

The control of the movement of link $O^5$ in accordance with the different positions assumed by lever P when member 15 is in its neutral or "no trend" operative position has been described in detail. When the galvanometer is deflected from its neutral position, indicating a trend of the measured condition away from its previous value, it is desirable to accordingly modify the action of the link $O^5$. If, for example, the value of the condition is suitably close to the desired value and the trend is toward said value, the said value may be quickly attained with no further applied correction and under such circumstances it is desirable to modify the correction called for by the mechanism responsive to the departure from normal value of the quantity.

More specifically, with the pen carriage 23 standing at a position indicating a value of the condition higher than the normal value indicated by table A, the subsequent release of lever P will guide the link $O^5$ along a path in which step OH will engage projection 15P. If the member 15 is then in a position in which lever 14 is in engagement with step 15L indicating that the value of the condition is falling, the projection 15P will be higher than its neutral position by an amount sufficient to form a pivotal point for link $O^5$ corresponding in effect to the pivotal point formed by the engagement of step ON or $ON^1$ of link $O^5$ with projection 15P of member 15 when the latter is in its neutral position. With this relation of the parts the member E will be deflected over its intermediate or neutral path. By this means the calling for an increase in the control agent as a result of the abnormal value of the condition, is cancelled as a result of the falling trend of the condition toward its normal value and therefore no ultimate control effect is produced with this condition.

Similarly with a low value of the condition obtaining, and with a rising trend of the latter, the condition may well require no correction. With the pen carriage standing at a position indicating a value of the condition lower than the normal value indicated by the table A, the subsequent release of lever P will position the latter to guide the link $O^5$ along a path in which step OL will engage projection 15P. If the member P is then in a position in which the lever 14 is in engagement with the step 15H, indicating that the value of the condition is rising, the projection 15P will be lower than its neutral position by an amount sufficient to form a pivotal point for link $O^5$ corresponding in effect to the pivotal point formed by the engagement of step ON or $ON^1$ of link $O^5$ with projection 15P of the lever P when the latter is in its neutral position. With this relation of the parts, the member E will also be deflected over its intermediate or neutral path. Thus the calling for an increase in the control agent as a result of the subnormal value of the condition is cancelled as a result of the rising trend toward its normal value and accordingly no effect is produced.

As a further example, if the value of condition is different from its normal value, and the trend of the condition is away from said value, it is desirable to apply a corrective agent tending to counteract said trend and to restore the condition to normal. More specifically, with the pen carriage 23 standing at a position indicating a value of the condition higher than the normal value indicated by table A, the subsequent release of lever P will result in positioning the latter to guide the link $O^5$ along a path in which step OH will engage projection 15P. If the member 15 is then in a position in which lever 14 is in engagement with the step 15H indicating that the value of the condition is rising, the projection 15P will be lower than its neutral position forming a pivotal point for link $O^5$ lower than the pivotal point formed by engagement of the step OH with the projection 15P when the lever 15 is in its neutral position. With this relation of the parts the member E will be deflected over a path which is lower than the previously mentioned low path.

Similarly if the value of the condition is low and the trend is away from said value it is desirable to apply a corrective agent tending to counteract said trend and restore the condition to normal. More specifically, with the pen carriage 23 standing at a position indicating a value of the condition lower than the normal value indicated by table A, the subsequent release of lever P will result in positioning the latter to guide link $O^5$ along a path in which step OL will engage projection 15P. If the member 15 is then in a position in which lever 14 is in engagement with the step 15L indicating that the value of the condition is falling, the projection 15P will be higher than its neutral position thereby forming a pivotal point for the link $O^5$ at an elevation which is higher than the pivotal point formed by the engagement of step OH with the projection 15P when the lever 15P is in its neutral position. With this relation of the parts the member E will be deflected along a path which is higher than the previously mentioned high path.

I may utilize the deflection of the member E over the paths which are respectively higher than the high path and lower than the low path for effecting control action in those extreme cases which are more effective than the control effected when the member E is deflected over its high path or low path respectively, but ordinarily I find it sufficient if the control action effected by deflection of the member E over the two extreme paths is identical to the control effect resulting from deflection of the member E over the high and low paths respectively as described in connection with the actuation of the frame HC. To this end the surfaces EH and EL of the member E are made wide enough that upon deflection of the member E over its higher than high or lower than low paths respectively, the switch $hc$ will be actuated as explained in connection with the actuation of arm $HC^1$ by member E. It will be understood that, by supplanting the three position switches $hb$ and $hc$ with five position switches and forming the steps EH and EL with additional higher and lower steps, I may obtain five positions of control instead of three. In most cases I find that the modifications just referred to are unnecessary in practice so that I prefer to illustrate the three position form.

It is desirable, furthermore, to effect a corrective action when the trend of the condition is away from normal even though condition is at that time at its normal value. Thus when member P is in its latched position, as it will normally be when the index of carriage 23 coincides exactly with the index of table A indicating that the normal value of the condition then exists, the down movement of link $O^5$ will result in engagement of step $ON^1$ thereof with projection 15P of member 15. If the member 15 is then in its normal position with member 14 in engagement with step 15N, indicating a stationary trend, the member E will subsequently be deflected over its neutral path as previously described. If, however, member 15 occupies a position in which either of its steps 15L or 15H is in engagement with member 14, as it will when the condition trend is falling or rising, the projection 15P will be turned to a position which is higher or lower respectively than the position it occupies when member 15 is in its normal position. The higher and lower positions of projection 15P are such as to form pivotal points for link $O^5$ on its step $ON^1$ which correspond respectively to the pivotal points formed by the engagement of steps OL and OH of link $O^5$ with the projection 15P of member 15 when the latter is in its normal position. Accordingly the engagement of step $ON^1$ with projection 15P when member 15 is in its falling trend and rising trend positions will result in the member E travelling over the previously mentioned high and low paths thereby actuating switch frame HC to apply a corrective action to oppose said trend.

Should the member P become released while the normal relation of carriage 23 and table A exists, contact of projection PS with neutral step SN of member S will result, and the above described combinations of projection 15P with step $ON^1$ would occur between projection 15P and step ON with the same resultant control effects.

The various control actions above described whereby switch frame HC is actuated in accordance with the different operative combinations of link $O^5$ and projection 15P are summarized in the table following. The "low path" and "high path", as designated, are the low and high paths respectively, traversed by member E, but represent high and low values respectively of the condition. Thus travel of member E over the "high path" indicates a low condition calling for an increase in the control agent. The reference letters 15L, 15N, and 15H indicate that the designated step of member 15 is then engaged by member 14 thereby fixing the angular position of member 15 and indicating a falling, stationary or rising condition. The reference letters OL, ON, $ON^1$ and OH indicate that the designated step of link $O^5$ is then engaged by projection 15P of lever 15. Reference letters PL, PN, PH and $PN^1$ indicate the four positions of lever P corresponding to a low, normal and high value of the condition and the latched position of member P. The high and low paths call respectively for increase and decrease in the application of the corrective agent. The neutral path calls for no change in the application of the corrective agent except for the restoring action hereinafter referred to, resulting from the action of switch $hb$ when returned to neutral position after being tilted from that position.

| Path of E | Combinations of parts 15, $O^5$ and P | | | |
|---|---|---|---|---|
| High path | 15L—$ON^1$—$PN^1$ | 15N—OL—PL | 15L—OL—PL | 15H—OL—PL |
| Neutral path | 15N—$ON^1$—$PN^1$ | 15N—ON—PN | 15L—OH—PH | 15H—OL—PL |
| Low path | 15H—$ON^1$—$PN^1$ | 15N—OH—PH | 15H—ON—PN | 15H—OH—PH |

It will be seen from the foregoing that the control component resulting from the relation of the control table A and the pen carriage 23 was combined with the trend component resultant from the existing deflection of the galvanometer pointer, into a resultant control action culminating in a position of the link $O^5$ and thereby determining a path for the pusher block E resulting in the selective closing of electrical switches for carrying out said control action. The closing of said switches preferably energizes circuits as shown in Fig. 1 for controlling a corrective agent. In the control of the temperature of a furnace for example, the galvanometer may be responsive to the change in temperature in said furnace. The periodic rebalancing of the potentiometric circuit including the galvanometer and the concurrent adjustment of carriage 23 renders the position of the latter a measure of the temperature to which the galvanometer is responsive. When so employed the control instrumentalities are adapted to govern the supply of fuel or the like which may be brought to the furnace through a pipe line $N^1$ having a valve N.

As diagrammatically shown in Fig. 1 the valve N is controlled by a motor mechanism indicated generally at M, comprising two reversible electrical motors $Ma$ and $Mb$. A lever MN connected by suitable gearing to motors $Ma$ and $Mb$ is adapted to be driven by either or both of the latter to thereby move the free end $N^3$ of a lever $N^2$. Lever $N^2$ is connected to valve N so that movement of either motor $Ma$ or $Mb$ in one direction or the other will adjust the valve N to open or close the latter. Movement of motor $Ma$ will result in rotation of lever MN about its point of connection $MN^1$ to motor $Mb$ and movement of motor $Mb$ will rotate lever MN about its point of connection $MN^2$ to motor $Ma$. Each motor $Ma$ and $Mb$ includes two reversible fields $MaL$ and $MaH$ and $MbL$ and $MbH$ respectively.

The motors $Ma$ and $Mb$, which may be termed the initial and floating motors respectively, are so geared to lever MN that motor $Ma$ when energized imparts a rapid movement to valve N and motor $Mb$ when energized imparts a relatively slow movement to the valve. The motor $Mb$ is adjusted by small increments to take care of relatively permanent changes in load upon the furnace and is directly under control of switch $hc$. Motor $Ma$ is adjusted by a large amount which is subsequently removed, the large adjustment serving to counteract the tendency of furnace lag or inertia to prevent a quick restoration of the temperature to normal. Motor $Mb$ is directly under control of switch $hb$.

Upon energization of contacts $hcL$ of switch $hc$, which will occur when it is desirable to increase the fuel supply to the furnace, a circuit will be closed from line conductor $L^1$ to switch

*ha*, through switch *ha* when closed over conductor *ad* to switch *hd*, through the switch *hd* when closed to conductor *cd* and switch *hc*, through contacts *hc*L of switch *hc*, to conductor *d*L¹, switch arm *b*L, conductor *Mb*L¹, field *Mb*L of motor *Mb*, armature *Mb*³, resistor *Mb*⁴ to line L². Motor *Mb* is thereby energized in a direction to open valve N to increase the supply of fuel through pipe N¹ to the furnace.

Upon energization of contacts *hc*H of switch *hc*, which will occur when it is desirable to decrease the fuel supply to the furnace, a circuit will be closed from line conductor L¹ to switch *ha*, through switch *ha* when closed, over conductor *ad* to switch *hd* through *hd* when closed to conductor *cd*, through contact *hc*H of switch *hc*, to conductor *d*H¹ switch arm *b*H, conductor *Mb*H¹, field *Mb*H, armature *Mb*³, resistor *Mb*⁴ to the opposite side of the line L². Motor *Mb* is thereby energized in a direction to closed valve N to decrease the supply of fuel through N¹ to the furnace.

The resistor *Mb*⁴ may be manually adjusted to vary the rate of response of the motor *Mb* upon energization for a given period. Switch arms *b*H and *b*L form limit switches of a well known type whereby rotation of the motor *Mb* in each direction is limited by the mechanical opening of one of said limit switches when motor *Mb* has rotated the maximum desirable amount. Ordinarily the limit switches for motor *Mb* are so adjusted that they will come into play only at points corresponding to the maximum desirable open or fully closed positions of the valve N. Thus switch *b*H will be actuated when a predetermined extent of valve closure has resulted from energization of field *Mb*H and switch *b*L will be actuated when a predetermined extent of valve opening has resulted from energization of field *Mb*L.

As noted above the switch *hb* is mechanically attached to the switch *hc* and accordingly when the contacts *hc*H of the switch *hc* are energized the contact *hb*H of the switch *hb* will also be energized. When this occurs an energizing circuit for the motor *Ma* will be closed over a circuit from the line conductor L¹ through the switch *ha* when closed, conductor *ae* to the switch *he*, through the switch *he* when the latter is in the position shown in Fig. 1, to conductor *be* to the switch *hb*, through contacts *hb*H when closed, conductor *a*H¹, switch arm *a*H to the field *Ma*H of the motor *Ma*. The motor *Ma* will thereby be energized in a direction to reduce the fuel supply to the furnace.

Similarly, the contact *hb*L will be energized simultaneously with the energization of the contact *hc*L of the switch *hc* thereby closing a circuit from line conductor L¹, switch *ha* and conductor *ae*, switch *he* and conductor *be* to the switch *hb*, through contact *hb*L, conductor *a*L¹, switch arm *a*L to the field *Ma*L, armature *Ma*³ to the opposite side of the line L². Motor *Ma* will thereby be energized in a direction to increase the fuel supply to the furnace.

The limit switch *a*H and *a*L are designed to provide an adjustable amount of travel for the motor *Ma* upon energization of the latter for a given period in a manner well known in the art. In view of its relatively high rate of travel, the motor *Ma* will reach the limit of its travel upon each energization thereof and thereby open its respective limit switch to terminate its movement. Specifically, when the switch *hb* is tilted to close contacts *hb*L the field *Ma*L will be energized and rotation of the motor in the desired direction will continue until the limit switch *a*L is mechanically opened to terminate such rotation. The movements of motor *Ma* which results in opening the energizing circuit over conductor *a*L¹ to field *Ma*L by opening limit switch *a*L, will move the said switch into a position in which conductor *a*L¹ is disconnected from field *Ma*L and simultaneously the conductor *a*N is connected to opposite field *Ma*H of the motor *Ma*. When the switch *hb* is thereafter tilted from the position in which the contacts *hb*L are closed, such tilting movement will energize the conductor *a*N over a circuit from line L¹ through switch *ha* conductor *ae* switch *he* and conductor *be*, to switch *hb* and through the latter to the conductor *a*N to thereby energize the motor *Ma* to turn in the opposite direction to a position intermediate its two extreme positions thus removing the correction made as a result of the energization of the contact *hb*L. In Fig. 11 is shown a switch suitable for this purpose which includes the switch members *a*H and *a*L pivoted respectively to a supporting plate at *a*H² and *a*L². A lever, *a*HL pivoted at *a*HL¹ is connected by means of link *a*HL¹⁰ to the motor *Ma*. As the motor *Ma* is rotated in either direction the vertical arm of cam *a*HL will engage either member *a*L or *a*H thereby turning the latter about its pivot point to break the circuit connection with contact *a*L³ or *a*H³ which are connected respectively to fields *Mb*L and *Mb*H. Lever *a*HL is provided with a pin *a*HL² engaged by a slot *a*HL³ in a lever *a*HL⁴ pivoted at *a*HL⁵. The lever *a*HL⁴ is provided with a flat toggle spring *a*HL⁶ adapted to contact a notch *a*HL⁷ in a contact piece *a*HL⁸ pivoted at *a*HL⁹ whereby piece *a*HL⁸ is urged to one of three positions accordingly as lever *a*HL is in its mid position or is in either of its extreme positions in which either member *a*L or *a*H is disengaged from its contact *a*L³ or *a*H³. Contact piece *a*HL⁸ carries two projections adapted to engage respectively, with contacts *a*L³ and *a*H³ when the piece is turned clockwise or counterclockwise which will occur when either member *a*H or *a*L is disengaged from contact *a*H³ or *a*L³. The projections of piece *a*HL⁸ are connected electrically to pivot *a*HL⁵ to which the conductor *a*N is connected. Thus for example upon energization of field *Ma*L over conductor *a*L¹ through member *a*L and contact *a*L³ motor *Ma* will run until the circuit is broken by contact of lever *a*HL with member *a*L and simultaneously the piece *a*HL⁸ will be snapped counterclockwise to engage its right hand projection with contact *a*H³ connecting common conductor *a*N to the reverse field *Ma*H. Upon subsequent energization of conductor *a*N, the motor *Ma* will be turned to the mid position shown in Fig. 11 and when that position is reached the part *a*HL⁸ will be snapped to its mid position breaking the circuit to field *Ma*H. Thus motor *Ma* provides for a predetermined valve movement in one direction or the other under certain conditions and for a return of the valve to its previous position under other conditions.

Each of the above traced circuits for energizing motors *Ma* and *Mb* includes the switch *ha* which, as clearly shown in Fig. 3, is mounted on a bracket *ha*¹, pivotally journalled to the instrument framework at *ha*². The bracket *ha*¹ carries a roller *ha*³ adapted to contact the edge 12c¹ of a sheet metal cam 12c and the edge of a disc 12d which are clamped by means of screw 12A to continuously rotating shaft 12. Cam 12a is formed generally segmental like with edge 12a¹ formed as an arc about shaft 12, and with sloped edge portions merging from edge 12a¹ toward the periphery of disc 12, so that once in each rotation of shaft 12 the bracket ha¹ will be turned gently about pivot ha² in the counterclockwise direction opening switch ha. During the major portion of the rotation of shaft 12 the roller ha³ is in contact with the edge of disc 12d in which position the switch ha is closed. One purpose of periodically opening switch ha is to prevent energization of the motors as a result of mercury in the other switch hb, hc, hd and he splashing back and forth as it is apt to do during a tilting movement of the switch. The adjusting movements of all the switches actuated by members E and EA occur while the switch ha is in open position as a result of the timing of cams 11 and 12a and switch ha is closed directly following the switch adjusting movement of members E and EA. The opening of switch ha is timed in conjunction with the actuation of switches hd and he to provide circuit interrupter features hereinafter described.

Each of the energizing circuits for the motor Mb above traced includes also the switch hd but by virtue of the parallel connections between the switch hd and another switch he, the motor Mb may be energized through switch he when in mid position even though hd is then open. The circuit in the latter case will differ from the circuits traced including the switch hd only in that the conductors ae and ce will replace the conductors ad and cd. Switches hd and he are adapted to act as interrupters for the energization of motors Ma and Mb. Motor Mb is preferably energized for a predetermined adjustable period which is shorter than the period of rotation of shaft 12. For example, in one embodiment, the shaft 12 makes one rotation in 3.6 seconds and the desirable movement of motor Mb under one operating condition may be obtained over the circuits traced if the latter are closed for periods of 2.7 seconds while under other operating conditions energization of said circuits for .9 seconds may be sufficient. I therefore provide means for adjusting switches hd and he as required to govern the running time of motor Mb which means are incorporated with the variable actuation of switches hd and he hereinafter described.

Switches hd and he like switches hb and hc are adapted to be actuated by a pusher block. The pusher block EA, pivoted to lever F at EF, by which switches hb and hc are actuated is similar to pusher block E in the manner in which it is reciprocated by the action of cam 11. The path taken by member EA in its movement to the left in Figs. 5 and 8 is governed by link OA⁵ corresponding in general purpose to the link O⁵. Link OA⁵ is raised together with link O⁵ as previously described and is controlled in its downward movement by means of the joint action of levers P and Q. Lever Q is journalled to the instrument plate at Q¹ and is urged clockwise about Q¹ by spring FA³ into a position in which its projection Q² may engage an extension 16D¹ of the pivot shaft carried by lever 16 upon which roller 16D is journalled. When lever 16 is intercepted in its counterclockwise movement in Fig. 3 by engagement of step 16G¹ or a step 16G² with projection 14¹¹ of pointer 14, the pin 16D¹ will be positioned in the path of projection Q² of member Q. Projection Q² is formed at the end of a bent over portion Q³ of the member Q which extends through the instrument side plate. When lever 16 is intercepted by engagement of a step 16G³ with projection 14¹¹, however, the pin 16D¹ will have been moved beyond the province of projection Q² and lever Q will be permitted to turn down to a position in which its bent over portion Q³ engages the lower edge of aperture 102 in the side plate. Thus lever Q has two operative positions, a low position which is limited by engagement with the instrument side plate when the galvanometer is deflected further than its first step off normal to either side and a high position limited by engagement with pin 16D¹ when the galvanometer is in its neutral position or is deflected to the first step off neutral in either direction. I could, by modifying the width of projection Q², cause the lever Q to be held in its high position, only when the galvanometer is at normal but I have found that for most practical purposes it is more desirable to use the design as shown in which lever Q occupies its high position when the galvanometer is at neutral or but one step removed therefrom.

Lever Q carries a pin OAQ which is surrounded by slot OA⁶ in the link OA⁵ forming a guide for the latter in its up and down movements to thereby guide link OA⁵ over one of two paths accordingly as lever Q is in its high or its low position. The extent to which link OA⁵ will fall in its down travel over either path is governed by the cooperation of a pair of steps OAN and OAO and another projection OAP of member P. The member P has two operative positions with respect to link OA, one in which lever P is latched by member R and the other in which it is unlatched. Although member P occupies various positions when unlatched as governed by member S, each of those positions as indicated in dotted lines in Fig. 8 is such that its projection OAP is not in the path of steps OAN and OAO. With member P in its unlatched position, the downward movement of link OA⁵ will be terminated by engagement of the upper end of slot OA⁶ with pin OAQ and the subsequent actuation of pusher block EA will carry the latter over a low path.

When member P is latched by member R and the trend of the condition is null or is slight whereby lever Q is held in its high position by pin 16D¹, the downward movement of link OA⁵ will result in engagement of the step OAN with projection OAP of member P. On the subsequent actuation of member EA, the link OA⁵ will pivot about the point of contact of step OAN and projection OAP to direct the member EA over a path which is somewhat higher than the previously mentioned low path and may be termed an intermediate path.

When member P is latched by member R and the trend of the condition is significant in either direction whereby lever Q is permitted to fall to its low position, the downward movement of link OA⁵ will result in engagement of step OAO with projection OAP of member P. On the subsequent actuation of member EA, the link OA⁵ will pivot about the point of contact of step OAO and projection OAP to direct the member EA over a path which is higher than either of the previously mentioned paths and may be termed a high path.

The means for variably actuating switches hd and he upon deflection of member EA over one of its three paths include finger pieces Ed and Ee, effectively integral with member EA, and formed in the planes respectively of arms Hd¹ and He¹ of brackets Hd and He as best shown in Figs. 5, 8 and 10. The finger pieces E$d$ and E$e$ are adapted to engage upper and lower projections on, and rotate in one direction or the other, the arms H$d^1$ and H$e^1$ to thereby rotate brackets H$d$ and H$e$. Switches $hd$ and $he$ are carried respectively by brackets H$d$ and H$e$.

Finger piece E$d$ is formed with fingers E$d$U, E$d$N and E$d$O. When member P is unlatched permitting member EA to travel over its low path the finger E$d$U will be in a position to engage the lower projection of arm H$d^1$ on the movement of member EA to the left in Fig. 8. Such movement will result in turning bracket H$d$ to a position clockwise of an intermediate position. When member P is latched and member Q is in its high position the member EA will travel over its intermediate path and in this path finger E$d$N will engage the upper projection of and urge the arm H$d^1$ and bracket H$d$ to the counter-clockwise position shown in full lines in Fig. 8. When member P is latched and member Q is in its low position the member EA will travel over its high path and in this path each of the fingers E$d$O will engage an upper or lower projection of arm H$d^1$ thereby turning bracket H$d$ to said intermediate position.

It is desirable to return the switch $hd$ to its intermediate position whenever it is deflected therefrom to a position clockwise thereof as seen in Figs. 3 and 10 and to this end I provided time actuated means including extension H$dt$ of bracket H$d$ extending around the instrument side plate, and a cooperating cam roller 12$d^1$. Roller 12$d^1$ is fastened to disc 12$d$ and therefore rotates with shaft 12 to engage surface H$dt^1$ of extension H$dt$ and turn the latter counterclockwise whenever moved to the position shown in Fig. 3.

The switch $hd$ is of the two contact mercury type with its two contacts disposed in the middle of the switch envelope so that the switch is closed only when in its intermediate position. Movement of switch $hd$ to its intermediate or closed position will occur in response to variations in the controlled condition only when the trend of the condition is significant but is cam actuated to its intermediate position by cam roller 12$d^1$ following a movement to the position of Fig. 3.

Finger piece E$e$ is formed with fingers E$e$U, and E$e$O. When member P is unlatched permitting member EA to travel over its low path the finger E$e$U will be in a position to engage the upper projection of arm H$e^1$ on the movement of member EA to the left in Fig. 8. Such movement will result in turning bracket H$e$ to a counterclockwise position. When member EA travels over its intermediate path the projection E$e$O will engage the lower projection of arm H$e^1$ thereby moving bracket H$e$ clockwise to a position corresponding to the angular position of bracket H$d$ in the furthermost clockwise position of the latter. When member EA travels over its high path finger E$e$O will again engage the lower projection of arm H$e^1$. Bracket H$e$ has no condition controlled intermediate position but is moved to an intermediate position following each movement in the clockwise direction in Fig. 3, through cam means corresponding generally to the timing means for bracket $hd$. The latter means includes extension H$et$ of bracket H$e$ and roller 12$e^1$ attached to disc 12$e$. The disc 12$e$ is fastened to shaft 12 by means of screw 12A. Since the longitudinal part H$d^2$ terminating in extension H$dt$ of bracket H$d$ necessarily passes through the plane of movement of the transverse member H$e^2$ connecting arm H$e^1$ with the longitudinal part H$e^3$ of bracket H$e$, the member H$e^2$ is made in the form of a yoke which straddles extension part H$d^2$ and does not interfere with movements of the latter to any position irrespective of the position of bracket H$e$.

The switch $he$ is of the five contact mercury type comprising a center electrode and two electrodes at each end of the envelope. When tilted to the position shown in Fig. 1 two of the end contacts are bridged by the mercury pool which thereby electrically connects the conductors $be$ and $ae$. When tilted from the position in which conductors $be$ and $ae$ are connected, to its intermediate position, a longitudinal extension of the end electrode which is connected to conductor $ae$ and the control electrode which is connected to conductor $ce$ will be bridged by the mercury pool. One electrode at the opposite end of the tube is not used and the other electrode at that end is connected to another line conductor $ae^1$ so that when the switch is tilted to a position in which these electrodes are bridged by the mercury pool no circuit closing function is performed. When the switch is tilted from the last mentioned position to its intermediate position, the mercury pool will bridge the electrode connected to line $ae^1$ and the electrode connected to conductor $ce$ thereby insuring energization of the latter when the switch is tilted in that direction. Theoretically I may omit one of line conductors $ae$ or $ae^1$ since the electrode connected to each should be connected to the electrode connected to conductor $ce$ whenever switch $he$ is in its mid position but I find in practice that it is desirable to insure against the mercury pool failing to connect those conductors when tilted in one direction or the other.

The timing of the actuation of switches $hd$ and $he$ may be conveniently made by adjusting discs 12$d$ and 12$e$ with respect to cam 12$a$. The cam 12$a$ is provided with hole 12$a^2$ adapted to engage a pin 17$a$ fixed to cam 17 which is fixed to shaft 12 thereby determining the point in the cycle of rotation of shaft 12 at which switch $ha$ will be actuated to its off position. Discs 12$d$ and 12$e$ are provided with a series of holes marked respectively with the numerals .9, 1.1, 1.6, 2.1, and 2.7, which holes are also adapted to engage pin 17$a$. The numerals designate the length of time in seconds during which the respective motor circuits are energized in a total cycle of 3.6 seconds. As shown in Fig. 3, the hole marked 2.7 of each disc is engaged by pin 17$a$. With this relation of the discs and cam 12$a$ the circuit energized by the turning of either switch $hd$ or $he$ to its mid position by roller 12$d^1$ or 12$e^1$ is broken 2.7 seconds later by engagement of cam surface 12$a^1$ with roller $ha^3$ thereby opening switch $ha$.

When lever P is latched, which will occur when the condition is normal or when the deviation component is rendered inoperative, the member EA will be deflected over its intermediate path or over its high path accordingly as the condition trend is stationary or slowly changing or is rapidly changing. Upon deflection of EA over its intermediate path, switch $hd$ will be actuated counterclockwise in Fig. 8 to an "off" position but bracket H$d$ will be disposed so as to be subsequently turned to the mid position by the cam roller 12$d^1$. Switch $he$ will be simultaneously turned clockwise in Fig. 8, so that motor M$a$ will be energized over the circuit previously traced including contacts $hb$L or $hb$H of switch $hb$ unless at that time the switch $hb$ is in its neutral position. When switch $hd$ is turned to its mid position by cam roller $12d^1$ motor $Mb$ will be energized over the circuit previously traced including contacts $hcL$ or $hcH$ of switch $hc$ unless at that time the switch $hc$ is in its neutral position. Swiches $hb$ and $hc$ would be in their neutral positions only as a result of an absolutely stationary condition. Thus with the member P latched up indicating that the condition is at or near its normal value and with a stationary trend, no fuel valve correction will be made. With a practically normal value of the condition however and a trend of the condition in one direction or the other culminating in the tilting of switches $hb$ and $hc$ in one direction or the other, the motor $Ma$ will be energized to produce a large fuel correction through motor $Ma$ which is calculated to arrest the trend of the condition and shortly thereafter the motor $Mb$ will be energized to provide a valve correction calculated to compensate for the change in condition demand which caused the undesirable trend.

Upon deflection of the member EA over its high path resulting from a greater rate of change in the condition as indicated by the galvanometer deflecting beyond its first step off neutral, switch $hd$ will be actuated to its intermediate or closed position, immediately energizing motor $Mb$. Switches $hb$ and $hc$ must then be in a position in which either pair of contacts $hcL$ and $hbL$ or $hcH$ and $hbH$ are closed because member Q cannot be lowered to direct the member EA over the high path unless the galvanometer pointer is deflected whereupon member 15 must direct the member E over a path in which switches $hb$ and $hc$ are tilted. Motor $Mb$ will thus be energized for the duration of a full cycle which will be terminated by the actuation of the switch $ha$ to the off position by cam $12a$. Since switch $hd$ is thus actuated to its middle position by the member EA the subsequent rotation of roller $12d^1$ toward engagement with the extension $hdt$ will result in a wiping engagement of the latter without changing the position of switch $hd$. The actuation of switch $he$ by member Ea concurrently with the actuation of switch $hd$ just described is identical with the previously described tilting of switch $he$ to its on position in which motor $Ma$ is energized.

Thus with a practically constant value of the condition and a rapid trend, the motor $Ma$ provides a large fuel correction and the motor $Mb$ provides a compensating adjustment which is greater than the adjustment made by motor $Mb$ when the trend is slow. With the slow trend condition and the indicated adjustment of the parts, motor $Mb$ would be run for 2.7 seconds but with the rapid trend condition motor $Mb$ would be run for nearly 3.6 seconds.

The motor $Ma$, it will be noted in each of the foregoing conditions, has run to its limit as determined by the opening of switch $aL$ or $aH$ and will there remain until energized in the reverse direction as a result of energization of its other field over the conductor $aN$ or over the other conductor $aL^1$ or $aH^1$ not just previously energized. The latter action resulting in either the return to mid position or rotation to its other extreme position of motor $Ma$ would occur only in the event that condition trend were stopped or reversed as indicated by the galvanometer standing undeflected or deflecting to the opposite side.

When lever P is unlatched which will normally occur only when the value of the condition as indicated by the position of carriage 23, is not normal, the switch $hd$ will be actuated by member EA travelling its low path, to its off position in which extension $Hdt$ of bracket $Hd$ will not be subsequently engaged by cam roller $12d^1$ and switch $hd$ will remain off until member EA is next actuated while lever P is latched. Accordingly no energizing circuit for the motor mechanism through switch $hd$ is completed and simultaneously with the actuation of switch $hd$ clockwise as seen in Fig. 8 to its off position the switch $he$ will be actuated to its counterclockwise off position. Thus neither motor circuit will be initially energized. It should be noted however that member P cannot be released to take other than a neutral position unless the condition is not normal as indicated by a departure of the carriage 23 from its normal position and the movement of the carriage cannot occur unless the galvanometer has previously deflected to control said movement, concurrently effecting the rotation of motor $Ma$ to its limit of movement in either direction. The motor $Ma$ will therefore stand in one of three positions when the value of the condition is off normal, namely: in its extreme position supplying a fuel correction in the direction to counteract the off normal condition; in its mid or non correction position; or in its other extreme position supplying a fuel correction in the direction which, if maintained, would produce a further off normal condition. In consequence of the action of roller $12e^1$, the switch $he$ will be subsequently actuated to its mid position in which conductors $ae^1$ and $ce$ will be connected thereby energizing motor $Mb$ in one direction or the other depending upon which of the pairs of contacts $hcL$ or $hcH$ of switch $hc$ are then closed and valve N will thus be given a movement in a direction to return the condition to normal.

The position in which motor $Ma$ is left preceding the unlatching of lever P will depend upon the condition trend at that time. If, after the deflection of the galvanometer which resulted in displacing the control carriage and in rebalancing the potentiometric circuit to return the galvanometer to neutral, the galvanometer remains at neutral indicating a stationary condition at a value different from normal; the initial motor $Ma$ will have been actuated in a direction to oppose the trend as a result of the closure of switches $hb$ and $he$ and if the unlatching of lever P occurs in the same cycle in which the galvanometer has been returned to neutral the additional movement of motor $Mb$ will occur while the initial correction of motor $Ma$ is still applied. If the return of the galvanometer to normal occurs in the cycle preceding the cycle in which lever P is unlatched, the motor $Ma$ will have been returned to its mid position as a result of the energization of motor $Ma$ through switch $hb$ and conductor $aN$ as the switch $hb$ is moved to its middle position as it will be moved with the galvanometer at neutral and the lever P latched; and the movement of motor $Mb$ during the cycle in which lever P is unlatched will occur after the correction applied by motor $Ma$ has been removed.

If the galvanometer pointer actually reverses in position and deflects to the opposite side following a deflection to one side and such deflection is detected in the same cycle in which lever P is unlatched, the switches $hb$ and $hc$ due to the combinative effect of part 15 and lever P will be moved to their mid positions thereby energizing motor $Ma$ to return to its mid position but resulting in no energization of motor $Mb$. If such galvanometer reversal occurs in the cycle preceding the cycle in which lever P is unlatched motor Ma will have reversed in direction and run to its opposite limit as a result of closure of switches hb and hc and motor Mb will have been energized in the reverse direction for a full or part cycle depending upon whether the galvanometer reversal were slow or rapid. The purpose of the last mentioned action is to check the tendency of the condition to reverse sharply and overshoot in the opposite direction which would result in a hunting condition. In the aggregate I obtain an action over a period of time including a number of cycles during one of which, the member P is unlatched, a control action jointly responsive to the condition trend and the value of the latter with respect to a predetermined normal.

A table of control actions may be conveniently made as follows:

| Value of the condition | Trend of the condition | Switch positions | | | Operation of mechanism M | |
| --- | --- | --- | --- | --- | --- | --- |
| | | hb and hc | hd | he | Ma | Mb |
| Lever P latched | Falling fast | F | M | F | Open | Open.* |
| | Falling slow | F | B-M | F | Open | Open. |
| | Stationary | M | B-M | F | Mid | ------ |
| | Rising slow | B | B-M | F | Close | Close. |
| | Rising fast | B | M | F | Close | Close.* |
| Lever P unlatched — Low | Falling | F | F | B-M | ------ | Open. |
| | Stationary | F | F | B-M | ------ | Open. |
| | Rising | M | F | B-M | ------ | ------ |
| Lever P unlatched — Correct | Falling | F | F | B-M | ------ | Open. |
| | Stationary | M | F | B-M | ------ | ------ |
| | Rising | B | F | B-M | ------ | Close. |
| Lever P unlatched — High | Falling | M | F | B-M | ------ | ------ |
| | Stationary | B | F | B-M | ------ | Close. |
| | Rising | B | F | B-M | ------ | Close. |

* Motor Mb runs for entire cycle.

In this table the positions F, M and B indicate the front, middle and back positions of the various switches, the front position occurring on clockwise rotation to the limit of switch movement in Figs. 1 and 8, the back position occurring on rotation to the limit in the opposite direction and the middle posititon being intermediate the front and back positions. Thus in Fig. 1, illustrating a low and falling condition, the full line positions represent the front positions of switches hb, hc and hd and the back position of switch he while the dotted line positions indicate the back positions of switches hb, hc and hd and the front position of switch he. In Fig. 10, illustrating a stationary condition with lever P latched, switches hb and hc are in their mid positions, switch hd is in its back position and switch he is in its front position.

The circuit connections may be tabulated as follows:

| Switch | Position | Circuit connections |
| --- | --- | --- |
| hb | F | Contacts hbH closed. |
| | M | Open. |
| | B | Contacts hbL closed. |
| hc | F | Contacts hcH closed. |
| | M | Open. |
| | B | Contacts hcL closed. |
| hd | F | Open. |
| | M | Closed. |
| | B | Open.* |
| he | F | Conductors ae and be connected. |
| | M | Conductors ae or ae¹ and ce connected. |
| | B | Open.* |

* Adapted to be cam actuated to middle position.

The action of the entire control device may be considered under less complex working conditions as follows, assuming the galvanometer to be undeflected and the index 23d to coincide with the index A⁶ indicating a balanced or normal condition. With the galvanometer pointer at normal the step 15N of the member 15 will be engaged by the pointer 14 thereby fixing the projection 15P in its intermediate position and the lever P being latched, the down movement of link O⁵ will result in engagement of the step ON¹ thereof with projection 15P thereby guiding the member E over its neutral path resulting in the actuation of switches hb and hc to their intermediate positions so that the subsequent closing of switch ha will result in no energization of the motor mechanism M irrespective of the positions of switches hd and he.

Upon a deflection of the galvanometer pointer one step to the right in Fig. 2 indicating a slowly falling condition, the step 15L of the member 15 will be engaged by pointer 14 fixing projection 15P in its high position. Lever P being latched, the step OL of the link O⁵ will engage projection 15P to guide member E over its high path closing contacts hcL of switch hc and contacts hbL of switch hb thereby preparing circuits over which the motor mechanism M will be energized by subsequent or simultaneous actuation of the switches ha, hd and he. Although open during the actuation of switches hc and hb the switch ha is closed directly thereafter, and since the deflection of the galvanometer pointer is but one step off normal the member Q will be in its raised position in which it will guide the link OA⁵ so that step OAN of the latter will engage projection OAP of the lever P. The member EA will thus be deflected over its intermediate path in which the switch hd is moved to its open position in which it is adapted to be subsequently closed by roller 12d¹. Switch he is actuated to the position indicated in Fig. 1 in which the conductors be and ae are connected thereby closing a circuit through the contacts hbL of the switch hb to operate the motor Ma to its limit. Upon the subsequent actuation of the switch he to its mid position by the roller 12e¹ the conductor ae will be connected to the conductor ce thereby energizing a circuit including the contacts hbL of the switch hc to rotate the motor Mb until the circuit is broken by the actuation of the switch ha by the cam 12a.

From the foregoing it will be clear that upon a small deflection of the galvanometer pointer from neutral the valve N will be given a large correction resulting from the energization of motor Ma and a small correction resulting from the energization of the motor Mb. The nature of the large correction is to counteract the trend of the condition and the nature of the small correction is to compensate for the changes in the operating condition causing the deviation.

It should be noted that concurrently with the control action instituted as a result of the deflection of the galvanometer pointer, potentiometric rebalancing operations were set into operation whereby the galvanometer is urged toward its null position and simultaneously the pen carriage is moved to a position indicating the then lower value of the measured condition. If upon the next rising movement of the table 3 the galvanometer pointer is found at its neutral position the subsequent actuation of the switches hd and he will be as aforesaid because I do not distinguish between the neutral position and the first step therefrom. Due to the movement of the carriage 23 from its normal position however the action of ratchet T will be commenced and since I do not choose to render effective the resulting slight deflection of the carriage 23 from normal as explained in connection with the operation of the ratchet mechanism T and the cooperating parts, the latched position of the member P will not be disturbed although the ratchet mechanism will be advanced in response to said departure. Since the step 15N of the member 15 will now be engaged by the pointer 14 with this relation of the parts the projection 15P will be moved to its intermediate position and the down movement of the link $O^5$ will be terminated by engagement of the step $ON^1$ of the projection 15P at an elevation such as to direct the oscillation of member E over its neutral path in which the switches $hb$ and $hc$ will be urged to their neutral position. The movement of the switch $hc$ to its neutral position will merely result in open circuiting the latter. The movement of switch $hb$ to its neutral position however will result in closing the contacts connected respectively with the conductors $ce$ and $aN$ whereby the motor $Ma$ will be energized in a direction to remove the correction just given by motor $Ma$ to the valve N. Thus the arresting tendency of the large initial correction given by motor $Ma$ is removed in view of the now stationary condition.

If the galvanometer pointer were thus to remain undeflected during subsequent cycles of operation, the carriage 23 being slightly below normal, the ratchet member T would be given a slight movement upon each reciprocation of the arm $8^1$ of the lever 8 until the cumulative effects of the departure of the condition from normal over a predetermined period of time resulted in the unlatching of the lever P and moving the latter into a position depending upon the then relation of the carriage 23 and table A. When such unlatching of the member P occurs with a slight deflection of the carriage 23 from normal which would occur as a result of the single excursion of the galvanometer pointer one step from its normal position and the width of the step SN of the member S were appropriately narrow so that any deflection whatever of the member S from its normal position would result in engagement of the member P with step SL; the down movement of the member $O^5$ would be terminated by engagement of its step OL with projection 15P thereby directing the member E over a high path and resulting in circuit energization in a manner identical to that described in connection with the first excursion of the galvanometer pointer from neutral. It will be understood that in the last mentioned circuit energization, the member EA would oscillate over a neutral path thereby urging the switch $hd$ to its open position and the switch $he$ to the position in which it energizes the motor $Ma$ and the switch $he$ would be subsequently returned to its mid position in which the motor $Mb$ would be energized for a short interval. The correction supplied by the motor $Ma$ is calculated to return the condition to normal and when such return to normal occurs resulting in the deflection of the member E over its neutral path on a subsequent oscillation, the lever P being then latched, with the galvanometer still undeflected, the motor $Ma$ would again be energized in a direction to return to its mid position thereby removing the initial correction. The correction supplied by the energization of motor $Mb$ is calculated to compensate for the change in the condition which resulted in the latter remaining departed from its normal value throughout the before mentioned period.

Assuming that the condition has again leveled out with the pen carriage 23 at its normal position and the galvanometer pointer undeflected, it being understood that the valve N is now in a new position differing from its old position by an amount depending upon the cumulative effect of the adjustments supplied by the motor $Mb$; upon a deflection of the galvanometer pointer to the right, larger than the previously mentioned deflection, indicating a rapidly falling condition, the member Q is moved to its low position. The down movement of the link $O^5$ will then be identical to the condition just described, but the member Q will now be in a position in which it will guide the link $OA^5$ along a path in which its step OAL will be intercepted by the projection OAP of the member P. The member EA will thereby be guided over its highest operative path in which the switch $hd$ will be actuated to its middle position thereby immediately energizing the motor $Mb$ and simultaneously the switch $he$ will be urged to the same position which is occupied by that switch on a small deflection of the galvanometer pointer from neutral and consequently the motor $Ma$ will be energized to rotate to the limit of its movement. With the foregoing condition of the parts the motor $Mb$ will run continuously until the circuit is interrupted by the cooperation of cam $12a$ and the switch $ha$ thereby moving valve N a larger amount than it was moved in response to the smaller deflection. In the foregoing operation it has been assumed that the extent of deflection of the galvanometer pointer was insufficient to rotate the ratchet T enough to release the lever P. Whether or not the deflection of the galvanometer pointer is sufficient to release member P depends upon the adjustment of the ratchet T and the relation of the step $sN$, $sL$, $sH$, etc. of the member S.

Various combinations of control which may follow the conditions just described depending upon the process reactions and demands have been described in detail and other combinations will be readily apparent.

Having now described my invention, what I claim as new and desire to secure by Letters Patent, is:

1. In a control instrument comprising control mechanism adapted for intermittent operation, the combination of means operating at a constant frequency, means cooperating with the first mentioned means to operate said mechanism at a frequency dependent upon an integrated value of the magnitude of a control quantity during the period between each such operation and the preceding operation of said mechanism and means for varying the effect of each such operation in accordance with said magnitude.

2. In a control instrument comprising control mechanism adapted for intermittent operation, the combination of means operating at a constant frequency, means cooperating with the first mentioned means to operate said mechanism at a frequency dependent upon the magnitude of a control quantity and means for varying the effect of each such operation in accordance with the trend of change in said magnitude.

3. In a control instrument comprising control mechanism adapted for intermittent operation, the combination of means operating at a constant frequency, means cooperating with the first mentioned means to operate said mechanism at a frequency dependent upon the magnitude of a control quantity, and means for varying the effect of each such operation in joint response to said magnitude and the trend of change therein.

4. In a control instrument comprising control mechanism actuated at regular intervals, the combination of means for producing control effects which are dependent upon the trend of change in magnitude of a control quantity and are independent of said magnitude at each interval of successive groups of successive intervals, and means for effecting control actions which are dependent upon said magnitude at intervals intervening between the intervals of said successive groups.

5. In a control instrument comprising mechanism actuated at regular intervals, the combination of means for producing control effects at each of the intervals of successive groups of successive intervals which are dependent upon the trend of change in magnitude of a control quantity, means for making the number of intervals in each group dependent on said magnitude, and means for effecting control actions dependent upon said magnitude at intervals intervening between the intervals of successive groups of intervals.

6. In a control instrument comprising mechanism actuated at regular intervals, the combination of means for producing control effects which are dependent upon the trend of change in magnitude of a control quantity, at each of the intervals of successive groups of successive intervals, means for making the number of intervals in each group dependent on said magnitude, and means for effecting control actions dependent upon said magnitude and upon the trend of change therein at intervals intervening between the intervals of successive groups of intervals.

7. In an instrument comprising two reciprocating members, means responsive in one predetermined manner both to the magnitude of a control quantity and to trend of change in said magnitude for causing one of said members to move along one or another of a plurality of paths, means responsive in a different predetermined manner to said magnitude and trend for causing the second member to move along one or another of a plurality of paths, and means for producing control effects selectively dependent on the paths of movements of the two members.

8. In an instrument comprising two reciprocating actuators, means responsive both to the magnitude of a control quantity and to trend of change in said magnitude for causing one of said members to move along one or another of a plurality of paths, means responsive both to an effect dependent on the magnitudes of said quantity during successive time intervals and to said trend at the conclusion of each of said intervals for causing the second member to move along one or another of a plurality of paths, and means for producing control effects dependent on the paths of movements of the two members.

9. In a control instrument, a timing means, and means responsive to the departure from normal of a control condition, and means cooperating with both of the previously mentioned means to effect control actions each in a direction and of a magnitude dependent upon the direction and magnitude of the condition when said control action is effected, and means cooperating with each of the two first mentioned means to make the time interval between each two successive control actions dependent on the cumulative effect of the magnitudes of the said departure during different successive portions of said interval.

10. In a control instrument, a member deflecting in accordance with the departure of a controlling condition from a normal value of the latter, a timing means, and means jointly controlled by said member and timing means for effecting a control action at the end of a time period dependent upon the magnitudes of said departure during different portions of said period, and of a magnitude dependent upon the magnitude of said condition at the end of said period.

11. In a control instrument, an adjustable member, means for giving said member successive adjustments each of a magnitude dependent on the extent of departure at the time of a controlling quantity from a normal value of the latter, and means operated at the end of each period during which the aggregate adjustment of said member is of a predetermined extent, to produce a control effect of a character dependent on the said departure at the time.

12. In a control instrument, a member deflecting in accordance with changes in a variable controlling condition, timing means, an adjustable part, mechanism controlled by said member and including means for effecting an adjustment of said part of predetermined extent during a period varying in length with the extent of departure of said condition from a predetermined value thereof during each of different portions of said period, and including means operating at the end of each such period to produce a control effect dependent in magnitude and direction on the relation of the actual and predetermined values of said condition at the time when said control effect is produced.

13. Control apparatus comprising in combination means responsive to the magnitude of a control condition, means responsive to the trend of change in said magnitude, a reciprocating member adapted to move along one or another of a plurality of paths, means for determining the path of said member in selective accordance with said magnitude and the direction of said trend, a second reciprocating member adapted to move along one or another of a plurality of paths, means for determining said path in selective accordance with the magnitude of said trend, and a control circuit including two switches, one of which is adjusted by one, and the other by the second of said members.

14. Control apparatus comprising in combination, means responsive to variation in magnitude of a controlling condition, means responsive to trend of change in said magnitude, periodically operating means, means adapted to be actuated by the last mentioned means at each operation thereof to effect a control action dependent upon said magnitude and trend, means for interrupting the operation of the last mentioned means for variable periods each dependent for its duration upon the deviation of said magnitude from a normal value thereof during the period, and means for effecting control actions solely dependent on said trend during each such periods.

15. Control apparatus comprising in combination, means responsive to variations in the magnitude of a controlling quantity, means responsive to the trend of change in said magnitude, a member, means operative to adjust said member into one or another of a plurality of positions in accordance with predetermined variations in said magnitude, intermittently operating means for holding said member in another position at intervals, control means selectively dependent on the position of said member when the latter is in any of the positions previously mentioned, other control means selectively dependent on whether said member is or is not in its last mentioned position, and means collectively controlled by the two last mentioned means for effecting control actions.

16. In control apparatus, the combination with means responsive to variations in a control condition, of a member, means controlled by the first mentioned means tending to adjust said member into different positions in accordance with the changes in said condition, and mechanism intermittently engaging said member and preventing its adjustment, said mechanism comprising a ratchet wheel adapted on a predetermined movement to release said member, a periodically actuated pawl for advancing said wheel, and means controlled by the first mentioned means controlling the advancement of the wheel by said pawl on each actuation of the latter.

17. In effecting control in collective response to the magnitude of a control condition and to the trend of change in said magnitude, the method which consists in effecting control actions in successive cycles, the duration of each of which is dependent on the magnitudes of said condition existing during different portions of the cycle, and in producing control action in an initial portion of each cycle which is dependent upon the trend of change in said magnitude during said portions, and in effecting a control action in the final portion of each cycle which is dependent on the said magnitude and trend at the time.

18. In control in response to variations in the value of a controlling quantity, the method which consists in effecting control actions with a variable frequency dependent upon a time function of the extent of departure of said value from a predetermined value, and each of a magnitude dependent on the departure at the time at which it is effected.

19. In effecting control in collective response to the magnitude of a control condition and in response to the magnitude and direction of trend of change of the condition magnitude, the method which consists in intermittently effecting control actions dependent upon the deviation of the magnitude of the control condition from a normal value thereof and upon the direction of said trend, and in effecting a control action dependent upon the magnitude of said trend during each interval between two successive ones of the first mentioned actions, and in varying the length of each of said intervals in response to variations in the said deviation existing during the interval.

20. In effectng control in collective response to the magnitude of a control condition and to the trend of change in said magnitude, the method which consists in effecting control actions as a result of, and dependent upon a difference between said magnitude and a normal value thereof, and in each period following each such control action, effecting a control action, dependent on the trend during that period, and in terminating said period as a result of a difference between the actual and predetermined values of said magnitude existing during said period and more or less quickly, depending on the magnitude and duration of said difference.

21. Control apparatus comprising in combination, means responsive to variations in the magnitude of a control quantity, means responsive to the trend of change in said magnitude, a control motor, means jointly controlled by the two first mentioned means for starting said motor into operation, and means controlled by the second mentioned means for varying the period during which said motor remains in operation in accordance with the rate of change in said magnitude.

22. Control apparatus comprising in combination, means responsive to variations in the magnitude of a control quantity, means responsive to the trend of change in said magnitude, a reversible control motor jointly controlled by the two first mentioned means for starting said motor into operation, in a direction dependent on the trend direction, and means controlled by the second mentioned means for varying the period during which said motor remains in operation in accordance with the rate of change in said magnitude.

23. Control apparatus comprising means responsive to the magnitude of a controlling condition, means responsive to trend of change in said magnitude, a control motor adapted to effect a relatively large control action on each actuation of the motor, a second control motor adapted to effect a relatively small control action on each actuation of the motor, and motor energizing connections collectively controlled by said means for operating both motors during certain periods in response to the direction and magnitude of said trend and for operating the second motor in collective response to said magnitude and direction of trend during periods alternating with the first mentioned periods and each dependent for its duration on the magnitude of said condition during the period.

24. In control apparatus, the combination with two electric control motors, of energizing circuit connections therefor including one switch, one operatively related individually to one of said motors, and a second switch so related to the other motor, and a third switch operatively related to both motors, means actuated in collective response to one relation between the magnitude and trend of change of a control condition for adjusting said one and second switches in selective accordance with said relation, and means responsive to another relation between said magnitude and trend for selectively adjusting said third switch in selective accordance with the last mentioned relation.

25. Control apparatus comprising in combination two electric control motors separately operable and collectively controlling a control quantity, energizing means for said motors including a plurality of control switches and means for automatically adjusting said switches to different positions in selective accordance with changes in the magnitude and trend of change of a control condition, and time controlled means for periodically adjusting one or more of said switches into positions from which they may be displaced by the subsequent operation of the second mentioned means.

26. Control apparatus comprising in combination two electric control motors separately operable and collectively controlling a control quantity, energizing means for said motors including a plurality of control switches and means for automatically adjusting said switches to different positions in selective accordance with changes in the magnitude and trend of change of a control condition, and time controlled means for periodically adjusting one or more of said switches into positions from which they may be displaced by the subsequent operation of the second mentioned means, and thereby controlling the lengths of the operating periods of one of said motors, said time controlled means being adjustable to vary said lengths.

27. Control apparatus comprising in combination two electric control motors separately operable and collectively controlling a control quantity, energizing means for said motors including a plurality of control switches and means for automatically adjusting said switches to different positions in selective accordance with changes in the magnitude and trend of change of a control condition, one of said switches being adapted to operatively energize one or the other of the motors accordingly as it is in one or another of two adjustment positions and timing means for periodically moving said switch into the two last mentioned positions.

28. Control apparatus comprising in combination two electric control motors separately operable and collectively controlling a control quantity, energizing means for said motors including a plurality of control switches and means for automatically adjusting said switches to different positions in selective accordance with changes in the magnitude and trend of change of a control condition, one of said switches being adapted for adjustment by said second mentioned means into a plurality of different positions from another position, and means for periodically moving said switch into the last mentioned position.

29. Control apparatus comprising in combination two electric control motors separately operable and collectively controlling a control quantity, energizing means for said motors including a plurality of control switches, means for automatically adjusting said switches to different positions in selective accordance with changes in the magnitude and trend of change of a control condition, limit switches actuated by one of said motors confining movement of that motor to a range between two end positions, and means operated on the actuation of either of said limit switches to establish an energizing circuit effective to return said motor from the corresponding end position to a mid-position on a subsequent actuation of one of the first mentioned switches.

30. In combination a control instrument comprising a plurality of mercury switches each carried by a bracket pivoted for independent turning movement, an oscillating selector element, a plurality of independently movable selector fingers mounted on said selector element, means for oscillating the latter to move said fingers into operative relation with said brackets and means responsive to a single condition for relatively moving said fingers whereby said brackets are selectively actuated in accordance with the value of the condition.

31. In combination a deflectable meter element, a reversible electrical control motor, a selective mercury switch adapted to energize said motor in one direction or another when tilted in one direction or the other, a second mercury switch for interrupting the circuit to the first mentioned switch, cyclically operating means to tilt the second mentioned switch to closed position at a predetermined point in the cycle, relay means cooperative with said element to tilt the first mentioned switch selectively in response to a deflection of said element and to tilt the second mentioned switch to closed position at a point in the said cycle earlier than the first mentioned point on a departure exceeding a predetermined amount whereby said motor is energized in a direction and for a longer or shorter period depending upon the direction and extent of deflection of said element.

32. Cyclically operating reversible electrical control means comprising a reversible electric control motor, a deflecting meter element, a switch controlled thereby to prepare an energizing circuit to rotate said motor in one direction or the other depending upon the direction of deflection of said element and a separate switch in said circuit operated at a point in the cycle depending upon the extent of departure of said element from a predetermined position.

THOMAS R. HARRISON.